(12) United States Patent
Kamohara

(10) Patent No.: US 12,269,959 B1
(45) Date of Patent: Apr. 8, 2025

(54) INK SET, IMAGE RECORDING METHOD, AND RECORDED ARTICLE

(71) Applicant: FUJIFILM Corporation, Tokyo (JP)

(72) Inventor: Kazuo Kamohara, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 336 days.

(21) Appl. No.: 18/051,523

(22) Filed: Nov. 1, 2022

Related U.S. Application Data

(63) Continuation of application No. PCT/JP2021/015197, filed on Apr. 12, 2021.

(30) Foreign Application Priority Data

| May 13, 2020 | (JP) | ................................. 2020-084438 |
| Sep. 16, 2020 | (JP) | ................................. 2020-155882 |

(51) Int. Cl.
  *C09D 11/40* (2014.01)
  *B41J 11/00* (2006.01)
  (Continued)

(52) U.S. Cl.
  CPC ........... *C09D 11/40* (2013.01); *B41J 11/0021* (2021.01); *B41M 5/502* (2013.01); *C09D 11/101* (2013.01); *C09D 11/107* (2013.01); *C09D 11/38* (2013.01)

(58) Field of Classification Search
  CPC ........... B41J 2/01; B41J 11/0021; B41J 2/17; B41M 5/502; C09D 167/00;
  (Continued)

(56) References Cited

U.S. PATENT DOCUMENTS

| 9,308,753 B2 | 4/2016 | Nakano |
| 10,774,228 B2 | 9/2020 | Sato et al. |

(Continued)

FOREIGN PATENT DOCUMENTS

| CN | 105415883 | 3/2016 |
| CN | 105462307 | 4/2016 |

(Continued)

OTHER PUBLICATIONS

Zeng Xiaoying et al., "Electron Beam Cured Coatings and Applications", Tianjin University Press, submit with partial English translation, Dec. 2014, pp. 1-4.
(Continued)

*Primary Examiner* — Thinh H Nguyen
(74) *Attorney, Agent, or Firm* — JCIPRNET

(57) ABSTRACT

An ink set including an undercoat composition containing at least one of a polymerizable monomer A including a polymerizable monomer A1 having a C log P value of 2.0 or less or an alkali-soluble polymer, and a surfactant, and an ink containing a polymerizable compound B, wherein, in the polymerizable monomer A, a ratio of a monofunctional polymerizable monomer is 30 mass % or more, the undercoat composition has an isocyanate compound content of less than 10 mass %, a content of the alkali-soluble polymer relative to a mass of a solid content of the undercoat composition is 1 mass % to 20 mass %, relative to a unit molecular weight defined as 100, in the polymerizable compound B, a mass-ratio-based weighted mean of a number of functional groups per unit molecular weight is 0.65 or more, and the ink has a tri- or higher functional polymerizable compound content of less than 10 mass %.

16 Claims, 1 Drawing Sheet

(51) Int. Cl.
*B41M 5/50* (2006.01)
*C09D 11/101* (2014.01)
*C09D 11/107* (2014.01)
*C09D 11/38* (2014.01)

(58) Field of Classification Search
CPC .... C09D 177/12; C09D 11/101; C09D 11/38; C09D 11/104; C09D 11/107
See application file for complete search history.

(56) References Cited

U.S. PATENT DOCUMENTS

| | | |
|---|---|---|
| 2012/0263926 A1 | 10/2012 | Sugai |
| 2013/0065027 A1 | 3/2013 | Mochizuki et al. |
| 2016/0075148 A1 | 3/2016 | Nakano |
| 2016/0090504 A1 | 3/2016 | Araki |
| 2017/0210144 A1 | 7/2017 | Hosaka |
| 2021/0206175 A1 | 7/2021 | Sasada et al. |
| 2022/0112385 A1* | 4/2022 | Shinjo ............... C09D 11/101 |

FOREIGN PATENT DOCUMENTS

| | | |
|---|---|---|
| CN | 108602672 | 9/2018 |
| CN | 108699332 | 10/2018 |
| EP | 1955858 | 8/2008 |
| EP | 2942204 | 11/2015 |
| JP | 2012219212 | 11/2012 |
| JP | 2013067770 | 4/2013 |
| JP | 2015036240 | 2/2015 |
| JP | 2015063064 | 4/2015 |
| JP | 2016060049 | 4/2016 |
| JP | 2016065200 | 4/2016 |
| JP | 2016069654 | 5/2016 |
| JP | 2017132091 | 8/2017 |
| JP | 2017201034 | 11/2017 |
| JP | 2018052607 | 4/2018 |
| JP | 2020001189 | 1/2020 |
| WO | 2016158209 | 10/2016 |
| WO | 2018042193 | 3/2018 |
| WO | 2018042194 | 3/2018 |
| WO | 2019081339 | 5/2019 |
| WO | 2020066388 | 4/2020 |

OTHER PUBLICATIONS

"Office Action of China Counterpart Application", issued on Jul. 7, 2023, with English translation thereof, pp. 1-27.
"Decision of Refusal of China Counterpart Application", issued on Jan. 8, 2024, with English translation thereof, p. 1- p. 16.
"Office Action of China Counterpart Application" with English translation thereof, issued on Mar. 30, 2023, p. 1-p. 22.
"Notice of Reasons for Refusal of Japan Counterpart Application", issued on Sep. 5, 2023, with English translation thereof, p. 1-p. 14.
"International Search Report (Form PCT/ISA/210) of PCT/JP2021/015197," mailed on Jun. 29, 2021, with English translation thereof, pp. 1-7.
"Written Opinion of the International Searching Authority (Form PCT/ISA/237)" of PCT/JP2021/015197, mailed on Jun. 29, 2021, with English translation thereof, pp. 1-8.
"Search Report of Europe Counterpart Application", issued on Oct. 10, 2023, pp. 1-7.

* cited by examiner

INK SET, IMAGE RECORDING METHOD, AND RECORDED ARTICLE

CROSS-REFERENCE TO RELATED APPLICATION

This application is a Continuation of International Application No. PCT/JP2021/015197, filed Apr. 12, 2021, which claims priority to Japanese Patent Application No. 2020-084438 filed May 13, 2020 and Japanese Patent Application No. 2020-155882 filed Sep. 16, 2020. Each of the above applications is hereby expressly incorporated by reference, in its entirety, into the present application.

BACKGROUND OF THE INVENTION

1. Field of the Invention

The present disclosure relates to an ink set, an image recording method, and a recorded article.

2. Description of the Related Art

In the related art, there is a known method of, in the case of using an ink to record an image on a substrate, using, in advance, an undercoat composition to form an undercoat layer on the substrate.

For example, JP2017-132091A describes an image forming step including a first ejection process of ejecting, onto a substrate, droplets of an actinic-energy-ray-curable ink in a solid pattern to form a solid droplet film, a first irradiation process of irradiating the solid droplet film with an actinic energy ray to form a solid cured film, a second ejection process of ejecting, onto the solid cured film, droplets of an actinic-energy-ray-curable ink in a dot pattern to form a dot-pattern droplet film, and a second irradiation process of irradiating the dot-pattern droplet film with an actinic energy ray to form a dot pattern. In addition, JP2012-219212A describes a printed matter including a substrate, a first printing layer disposed in a first processing region on the substrate and formed by printing using a first curable ink at least containing a monofunctional polymerizable compound, and a second printing layer disposed in a second processing region on the substrate and formed by printing using a second curable ink at least containing a polyfunctional polymerizable compound.

SUMMARY OF THE INVENTION

In an image recorded article obtained by, onto a substrate, applying an undercoat composition and an ink, the image needs to be peelable from the substrate in some cases. On the other hand, such an image needs to have water resistance so as not to be peeled by water in some cases and it has been difficult to satisfy both of the needs.

Under such circumstances, the present disclosure has been made; embodiments of the present invention provide an ink set and an image recording method that enable recording of an image having high alkali-peelability and high water resistance.

Another embodiment according to the present invention provides a recorded article including an image having high alkali-peelability and high water resistance.

The present disclosure includes the following embodiments.

<1> An ink set including an undercoat composition containing at least one of a polymerizable monomer A including a polymerizable monomer A1 having a C log P value of 2.0 or less or an alkali-soluble polymer, and a surfactant; and an ink containing a polymerizable compound B, wherein, in the polymerizable monomer A, a ratio of a monofunctional polymerizable monomer is 30 mass % or more, the undercoat composition has an isocyanate compound content of, relative to a total amount of the undercoat composition, less than 10 mass %, the undercoat composition has a content of the alkali-soluble polymer of, relative to a mass of a solid content of the undercoat composition, 1 mass % or more and 20 mass % or less, relative to a unit molecular weight defined as 100, in the polymerizable compound B, a mass-ratio-based weighted mean of a number of functional groups per unit molecular weight is 0.65 or more, and the ink has a tri- or higher functional polymerizable compound content of, relative to a total amount of the polymerizable compound B, less than 10 mass %.

<2> The ink set according to <1>, wherein the polymerizable monomer A1 is at least one of a monofunctional polymerizable monomer or a bifunctional polymerizable monomer.

<3> The ink set according to <1> or <2>, wherein a content of the polymerizable monomer A1 relative to a total amount of the polymerizable monomer A is 5 mass % to 40 mass %.

<4> The ink set according to any one of <1> to <3>, wherein the polymerizable monomer A1 has a molecular weight of 200 or more.

<5> The ink set according to any one of <1> to <4>, wherein the polymerizable monomer A1 has a C log P value of 1.0 or less and is a monofunctional polymerizable monomer.

<6> The ink set according to any one of <1> to <5>, wherein the polymerizable monomer A1 includes a polymerizable monomer A11 having an acid group.

<7> The ink set according to any one of <1> to <6>, wherein the polymerizable monomer A further includes a bifunctional polymerizable monomer A2 having at least one of a branched structure or an alicyclic structure, and a content of the bifunctional polymerizable monomer A2 relative to a total amount of the polymerizable monomer A is 3 mass % to 20 mass %.

<8> The ink set according to any one of <1> to <7>, wherein the polymerizable compound B has a molecular weight of 200 or more.

<9> The ink set according to any one of <1> to <8>, wherein, in the polymerizable compound B, a ratio of a bifunctional polymerizable compound is 50 mass % or more.

<10> The ink set according to any one of <1> to <9>, wherein the polymerizable compound B includes a polymerizable compound B1 having a C log P value of 1.5 or less, and a content of the polymerizable compound B1 relative to a total amount of the polymerizable compound B is 1 mass % to 30 mass %.

<11> The ink set according to any one of <1> to <10>, wherein the alkali-soluble polymer intramolecularly has an acid group.

<12> The ink set according to <11>, wherein the alkali-soluble polymer is a radical-polymerizable compound having a radical-polymerizable group (hereafter, also simply referred to as the polymerizable group).

<13> The ink set according to <12>, wherein the radical-polymerizable compound has, in a single molecule, 2 to 4 radical-polymerizable groups.

<14> An image recording method using the ink set according to any one of <1> to <13>, the method including an undercoat-composition application step of applying, onto a substrate, the undercoat composition by an ink jet recording process; a first-actinic-energy-ray irradiation step of irradiating the undercoat composition with a first actinic energy ray; an ink application step of applying, onto the undercoat composition having been irradiated with the first actinic energy ray, the ink by an ink jet recording process; and a second-actinic-energy-ray irradiation step of irradiating the ink with a second actinic energy ray.

<15> The image recording method according to <14>, wherein, in the first-actinic-energy-ray irradiation step, the undercoat composition is semi-cured, and, in the second-actinic-energy-ray irradiation step, irradiation with the second actinic energy ray is performed in an atmosphere having an oxygen concentration of less than 1 vol %.

<16> A recorded article including an undercoat layer being a solidified product of the undercoat composition of the ink set according to any one of <1> to <13>, and at least two ink images being cured products of the ink of the ink set according to any one of <1> to <13> and being different from each other in hue, wherein one of the two ink images includes a dot code and another of the two ink images includes at least one selected from the group consisting of a code image including a two-dimensional matrix code and a one-dimensional bar code and an image other than the code image.

<17> The recorded article according to <16>, wherein the dot code has at least one of a yellow-based hue or infrared absorbency and the at least one selected from the group has a visible color other than the yellow-based hue.

The present disclosure provides an ink set and an image recording method that enable recording of an image having high alkali-peelability and high water resistance.

The present disclosure provides a recorded article including an image having high alkali-peelability and high water resistance.

DESCRIPTION OF THE PREFERRED EMBODIMENTS

Figure 1:
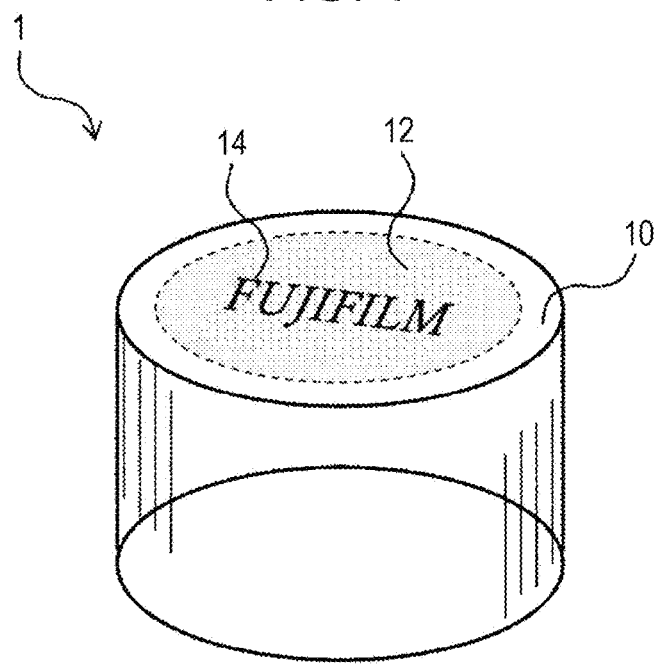
FIG. 1 is a schematic perspective view of a bottle cap serving as an example of a recorded article according to the present disclosure.

Hereinafter, an ink set, an image recording method, and a recorded article according to the present disclosure will be described in detail.

In this Specification, numerical ranges written in the form of "a value 'to' another value" mean a range including the value and the other value as the minimum value and the maximum value.

In this Specification, among numerical ranges described in series, the upper limit value or the lower limit value of a numerical range may be replaced by the upper limit value or the lower limit value of one of other numerical ranges described in series. For numerical ranges described in this Specification, the upper limit value or the lower limit value of such a numerical range may be replaced by a value described in Examples.

In this Specification, for the amount of each of components in a composition, the amount means, when the composition contains plural substances belonging to such a component, the total amount of the plural substances in the composition unless otherwise specified.

In this Specification, combinations of two or more preferred embodiments are more preferred embodiments.

In this Specification, the term "step" includes not only an independent step, but also a step that is not clearly distinguished from another step but that achieves the intended result of the step.

In this Specification, "image" means generally films formed by applying an undercoat composition and an ink in this order, and "image recording" means formation of an image (namely, a film).

In this Specification, the concept of "image" encompasses solid images (solid images).

In this Specification, "(meth)acrylate" is a concept encompassing both of acrylate and methacrylate. In addition, "(meth)acrylic" is a concept encompassing both of acrylic and methacrylic.

Ink Set

An ink set according to the present disclosure includes an undercoat composition containing at least one of a polymerizable monomer A including a polymerizable monomer A1 having a C log P value of 2.0 or less or an alkali-soluble polymer, and a surfactant; and an ink containing a polymerizable compound B, wherein, in the polymerizable monomer A, a ratio of a monofunctional polymerizable monomer is 30 mass % or more, the undercoat composition comprises an isocyanate compound at a content of, relative to a total amount of the undercoat composition, less than 10 mass %, the undercoat composition comprises the alkali-soluble polymer at a content of, relative to a mass of a solid content of the undercoat composition, 1 mass % or more and 20 mass % or less, a mass-ratio-based weighted mean of a number of functional groups in the polymerizable compound B, per unit molecular weight, is 0.65 or more, provided that a unit molecular weight of the polymerizable compound B being defined as 100, and the ink comprises a tri- or higher functional polymerizable compound at a content of, relative to a total amount of the polymerizable compound B, less than 10 mass %.

In the ink set according to the present disclosure, in an embodiment, the undercoat composition contains a polymerizable monomer A including a polymerizable monomer A1 having a C log P value of 2.0 or less. The polymerizable monomer A1 having a C log P value of 2.0 or less has high hydrophilicity. Thus, when the undercoat composition includes the polymerizable monomer A1 having a C log P value of 2.0 or less, the recorded image is easily peeled by alkali from the substrate. Thus, the recorded image has high alkali-peelability.

In another embodiment, the undercoat composition contains an alkali-soluble polymer. Alkali-soluble polymers have high hydrophilicity. Thus, when the undercoat composition includes an alkali-soluble polymer, the recorded image is easily peeled by alkali from the substrate.

In the ink set according to the present disclosure, the undercoat composition has an isocyanate compound content of, relative to the total amount of the undercoat composition, less than 10 mass %. In the undercoat composition, the isocyanate compound tends to form a hydrogen bond with the substrate, which tends to increase the adhesiveness to the substrate. When the undercoat composition has an isocyanate compound content of, relative to the total amount of the undercoat composition, less than 10 mass %, the recorded image has high alkali-peelability. The undercoat composition may have an isocyanate compound content of 0 mass %.

Furthermore, the surfactant is included, so that the alkali solution tends to enter the gap on the substrate, which inferentially results in improvement in the alkali-peelability. From the viewpoint of the surface tension balance between the undercoat composition and the ink, when the surface tension of the undercoat composition is set to be lower than the surface tension of the ink, the ink tends to stay to achieve suppression of excessive spreading of the landed droplets (dots), which also contributes to improvement in the image quality.

In the ink set according to the present disclosure, in the polymerizable monomer A, the ratio of a monofunctional polymerizable monomer is 30 mass % or more, so that the residual stress due to shrinkage on curing does not become excessively high. Specifically, an increase in the amount of polyfunctional polymerizable monomer results in an increase in the cross-linking density to improve the water resistance, but tends to cause high residual stress due to shrinkage on curing and tends to result in peeling inferentially. Thus, the ink set according to the present disclosure provides a recorded image having high water resistance.

In the ink set according to the present disclosure, the specific polymer content is 1 mass % or more and 20 mass % or less, to provide a recorded image in which alkali-peelability and water resistance are both effectively achieved.

In the ink set according to the present disclosure, a mass-ratio-based weighted mean of a number of functional groups in the polymerizable compound B, per unit molecular weight, is 0.65 or more, provided that a unit molecular weight of the polymerizable compound B being defined as 100. In the ink set according to the present disclosure, the undercoat composition is used to form an undercoat layer, subsequently the ink is applied onto the undercoat layer and irradiated with an actinic energy ray, to form an ink layer. The irradiation with an actinic energy ray causes polymerization of the polymerizable compound B included in the ink. The inventors of the present invention focused on change in shrinkage on curing in response to the number of the functional groups of the polymerizable compound B and the molecular weight of the polymerizable compound B, and have found that, when, in the polymerizable compound B, a mass-ratio-based weighted mean of the number of the functional groups per unit molecular weight is 0.65 or more, the recorded image has high alkali-peelability and high water resistance. When the weighted mean is 0.65 or more, cross-linking causes shrinkage on curing to generate residual stress, so that the recorded image is easily peeled by alkali from the substrate inferentially. When the weighted mean is 0.65 or more, polymerization of the polymerizable compound B forms a cross-linked structure, so that the ink layer resists entry of water and has high water resistance inferentially.

In the ink set according to the present disclosure, the ink has a tri- or higher functional polymerizable compound content of, relative to the total amount of the polymerizable compound B, less than 10 mass %. An increase in the tri- or higher functional polymerizable compound content results in an increase in the cross-linking density. When the ink has a tri- or higher functional polymerizable compound content of, relative to the total amount of the polymerizable compound B, less than 10 mass %, without an excessive increase in the cross-linking density, alkali appropriately enters the ink layer and the undercoat layer, so that the layers are easily peeled from the substrate inferentially.

The ink may have a tri- or higher functional polymerizable compound content of 0 mass %.

Hereinafter, components included in the undercoat composition and the ink that constitute the ink set according to the present disclosure will be described.

Undercoat Composition

In the present disclosure, the undercoat composition contains at least one of a polymerizable monomer A including a polymerizable monomer A1 having a C log P value of 2.0 or less or an alkali-soluble polymer.

First, as an embodiment, an embodiment in which the undercoat composition contains a polymerizable monomer A including a polymerizable monomer A1 having a C log P value of 2.0 or less will be described.

Polymerizable Monomer A

In the present disclosure, the polymerizable monomer included in the undercoat composition is referred to as "polymerizable monomer A". The polymerizable monomer A is a compound having a molecular weight of less than 1000, and is distinguished from polymers. Of the polymerizable monomer A, a polymerizable monomer having a C log P value of 2.0 or less is referred to as "polymerizable monomer A1".

The polymerizable monomer A includes the polymerizable monomer A1 having a C log P value of 2.0 or less.

The undercoat composition may include a single polymerizable monomer A species alone or may include two or more polymerizable monomer A species. The undercoat composition may include a single polymerizable monomer A1 species alone or may include two or more polymerizable monomer A1 species. The polymerizable monomer A1 will be described in detail later.

Polymerizable monomers mean compounds having, in a single molecule, at least one polymerizable group. In the polymerizable monomer A, the polymerizable group may be a cationic-polymerizable group or a radical-polymerizable group, but is, from the viewpoint of curability, preferably a radical-polymerizable group. The radical-polymerizable group is, from the viewpoint of curability, preferably an ethylenically unsaturated group.

The polymerizable monomer A may be a monofunctional polymerizable monomer having a single polymerizable group, or may be a polyfunctional polymerizable monomer having two or more polymerizable groups.

Monofunctional Polymerizable Monomer

The monofunctional polymerizable monomer is not particularly limited as long as it is a compound having a single polymerizable group. The monofunctional polymerizable monomer is, from the viewpoint of curability, preferably a monofunctional radical-polymerizable monomer, more preferably a monofunctional ethylenically unsaturated compound.

Examples of the monofunctional ethylenically unsaturated compound include monofunctional (meth)acrylates, monofunctional (meth)acrylamides, monofunctional aromatic vinyl compounds, monofunctional vinyl ethers, and monofunctional N-vinyl compounds.

Examples of the monofunctional (meth)acrylates include methyl (meth)acrylate, ethyl (meth)acrylate, propyl (meth)acrylate, n-butyl (meth)acrylate, hexyl (meth)acrylate, 2-ethylhexyl (meth)acrylate, tert-octyl (meth)acrylate, isoamyl (meth)acrylate, decyl (meth)acrylate, isodecyl (meth)acrylate, lauryl (meth)acrylate, stearyl (meth)acrylate, isostearyl (meth)acrylate, cyclohexyl (meth)acrylate, 4-n-butylcyclohexyl (meth)acrylate, 4-tert-butylcyclohexyl (meth)acrylate, bornyl (meth)acrylate, isobornyl (meth)acrylate, 2-ethylhexyl diglycol (meth)acrylate, butoxyethyl (meth)acrylate, 2-chloroethyl (meth)acrylate, 4-bromobutyl (meth)acrylate, cyanoethyl (meth)acrylate, benzyl (meth)

acrylate, butoxymethyl (meth)acrylate, 3-methoxybutyl (meth)acrylate, 2-(2-methoxyethoxy)ethyl (meth)acrylate, 2-(2-butoxyethoxy)ethyl (meth)acrylate, 2,2,2-tetrafluoroethyl (meth)acrylate, 1H,1H,2H,2H-perfluorodecyl (meth)acrylate, 4-butylphenyl (meth)acrylate, phenyl (meth)acrylate, 2,4,5-tetramethylphenyl (meth)acrylate, 4-chlorophenyl (meth)acrylate, 2-phenoxymethyl (meth)acrylate, 2-phenoxyethyl (meth)acrylate, glycidyl (meth)acrylate, glycidyloxybutyl (meth)acrylate, glycidyloxyethyl (meth)acrylate, glycidyloxypropyl (meth)acrylate, tetrahydrofurfuryl (meth)acrylate, 2-hydroxyethyl (meth)acrylate, 3-hydroxypropyl (meth)acrylate, 2-hydroxypropyl (meth)acrylate, 2-hydroxybutyl (meth)acrylate, 3-hydroxybutyl (meth)acrylate, 4-hydroxybutyl (meth)acrylate, cyclic trimethylolpropane formal (meth)acrylate, phenyl glycidyl ether (meth)acrylate, dimethylaminoethyl (meth)acrylate, diethylaminoethyl (meth)acrylate, dimethylaminopropyl (meth)acrylate, diethylaminopropyl (meth)acrylate, trimethoxysilylpropyl (meth)acrylate, trimethylsilylpropyl (meth)acrylate, polyethylene oxide monomethyl ether (meth)acrylate, polyethylene oxide (meth)acrylate, polyethylene oxide monoalkyl ether (meth)acrylate, dipropylene glycol (meth)acrylate, polypropylene oxide monoalkyl ether (meth)acrylate, 2-methacryloyloxyethyl succinic acid, 2-methacryloyloxyhexahydrophthalic acid, 2-methacryloyloxyethyl-2-hydroxypropyl phthalate, ethoxydiethylene glycol (meth)acrylate, butoxydiethylene glycol (meth)acrylate, trifluoroethyl (meth)acrylate, perfluorooctylethyl (meth)acrylate, 2-hydroxy-3-phenoxypropyl (meth)acrylate, ethylene oxide- (EO-) modified phenol (meth)acrylate, EO-modified cresol (meth)acrylate, EO-modified nonylphenol (meth)acrylate, propylene oxide- (PO-) modified nonylphenol (meth)acrylate, EO-modified-2-ethylhexyl (meth)acrylate, dicyclopentenyl (meth)acrylate, dicyclopentenyloxyethyl (meth)acrylate, dicyclopentanyl (meth)acrylate, (3-ethyl-3-oxetanylmethyl) (meth)acrylate, phenoxyethylene glycol (meth)acrylate, 2-carboxyethyl (meth)acrylate, and 2-(meth)acryloyloxyethyl succinate.

Examples of the monofunctional (meth)acrylamides include (meth)acrylamide, N-methyl (meth)acrylamide, N-ethyl (meth)acrylamide, N-propyl (meth)acrylamide, N-n-butyl (meth)acrylamide, N-t-butyl (meth)acrylamide, N-butoxymethyl (meth)acrylamide, N-isopropyl (meth)acrylamide, N-methylol (meth)acrylamide, N,N-dimethyl (meth)acrylamide, N,N-diethyl (meth)acrylamide, and (meth)acryloylmorpholine.

Examples of the monofunctional aromatic vinyl compounds include styrene, dimethylstyrene, trimethylstyrene, isopropylstyrene, chloromethylstyrene, methoxystyrene, acetoxystyrene, chlorostyrene, dichlorostyrene, bromostyrene, vinylbenzoic acid methyl ester, 3-methylstyrene, 4-methylstyrene, 3-ethylstyrene, 4-ethylstyrene, 3-propylstyrene, 4-propylstyrene, 3-butylstyrene, 4-butylstyrene, 3-hexylstyrene, 4-hexylstyrene, 3-octylstyrene, 4-octylstyrene, 3-(2-ethylhexyl)styrene, 4-(2-ethylhexyl)styrene, allylstyrene, isopropenylstyrene, butenylstyrene, octenylstyrene, 4-t-butoxycarbonylstyrene, and 4-t-butoxystyrene.

Examples of the monofunctional vinyl ethers include methyl vinyl ether, ethyl vinyl ether, propyl vinyl ether, n-butyl vinyl ether, t-butyl vinyl ether, 2-ethylhexyl vinyl ether, n-nonyl vinyl ether, lauryl vinyl ether, cyclohexyl vinyl ether, cyclohexylmethyl vinyl ether, 4-methylcyclohexylmethyl vinyl ether, benzyl vinyl ether, dicyclopentenyl vinyl ether, 2-dicyclopentenoxyethyl vinyl ether, methoxyethyl vinyl ether, ethoxyethyl vinyl ether, butoxyethyl vinyl ether, methoxyethoxyethyl vinyl ether, ethoxyethoxyethyl vinyl ether, methoxypolyethylene glycol vinyl ether, tetrahydrofurfuryl vinyl ether, 2-hydroxyethyl vinyl ether, 2-hydroxypropyl vinyl ether, 4-hydroxybutyl 4-vinyl ether, hydroxymethylcyclohexylmethyl vinyl ether, diethylene glycol monovinyl ether, polyethylene glycol vinyl ether, chloroethyl vinyl ether, chlorobutyl vinyl ether, chloroethoxyethyl vinyl ether, phenylethyl vinyl ether, and phenoxypolyethylene glycol vinyl ether.

Examples of the monofunctional N-vinyl compounds include N-vinyl-8-caprolactam and N-vinylpyrrolidone.

Polyfunctional Polymerizable Monomer

The polyfunctional polymerizable monomer is not particularly limited as long as it is a compound having two or more polymerizable groups. The polyfunctional polymerizable monomer is, from the viewpoint of curability, preferably a polyfunctional radical-polymerizable monomer, more preferably a polyfunctional ethylenically unsaturated compound.

Examples of the polyfunctional ethylenically unsaturated compound include polyfunctional (meth)acrylate compounds and polyfunctional vinyl ethers.

Examples of the polyfunctional (meth)acrylates include ethylene glycol di(meth)acrylate, diethylene glycol di(meth)acrylate, triethylene glycol di(meth)acrylate, polyethylene glycol di(meth)acrylate, propylene glycol di(meth)acrylate, dipropylene glycol di(meth)acrylate, tripropylene glycol di(meth)acrylate, polypropylene glycol di(meth)acrylate, butylene glycol di(meth)acrylate, tetraethylene glycol di(meth)acrylate, neopentyl glycol di(meth)acrylate, 3-methyl-1,5-pentanediol di(meth)acrylate, hexanediol di(meth)acrylate, heptanediol di(meth)acrylate, EO-modified neopentyl glycol di(meth)acrylate, PO-modified neopentyl glycol di(meth)acrylate, EO-modified hexanediol di(meth)acrylate, PO-modified hexanediol di(meth)acrylate, octanediol di(meth)acrylate, nonanediol di(meth)acrylate, decanediol di(meth)acrylate, dodecanediol di(meth)acrylate, 1,6-hexanediol di(meth)acrylate, glycerol di(meth)acrylate, pentaerythritol di(meth)acrylate, ethylene glycol diglycidyl ether di(meth)acrylate, diethylene glycol diglycidyl ether di(meth)acrylate, tricyclodecanedimethanol di(meth)acrylate, trimethylolethane tri(meth)acrylate, trimethylolpropane tri(meth)acrylate, trimethylolpropane EO-modified tri (meth)acrylate, pentaerythritol tri(meth)acrylate, pentaerythritol tetra(meth)acrylate, dipentaerythritol tetra(meth)acrylate, dipentaerythritol penta(meth)acrylate, dipentaerythritol hexa(meth)acrylate, tri(meth)acryloyloxyethoxy trimethylolpropane, glycerol polyglycidyl ether poly(meth)acrylate, and tris (2-acryloyloxyethyl) isocyanurate.

Such a polyfunctional (meth)acrylate may be a urethane (meth)acrylate being a reaction product of a bifunctional isocyanate compound and a hydroxy-group-containing polyfunctional (meth)acrylate. Examples of the bifunctional isocyanate compound include compounds described later.

Alternatively, the polyfunctional (meth)acrylate may be an epoxy (meth)acrylate being a reaction product of (meth)acrylic acid and an epoxy resin. Examples of the epoxy resin include a bisphenol A epoxy resin and a cresol novolac epoxy resin.

Examples of the polyfunctional vinyl ethers include 1,4-butanediol divinyl ether, ethylene glycol divinyl ether, diethylene glycol divinyl ether, triethylene glycol divinyl ether, polyethylene glycol divinyl ether, propylene glycol divinyl ether, butylene glycol divinyl ether, hexanediol divinyl ether, 1,4-cyclohexanedimethanol divinyl ether, bisphenol A alkylene oxide divinyl ether, bisphenol F alkylene oxide divinyl ether, trimethylolethane trivinyl ether, trimethylolpropane trivinyl ether, ditrimethylolpropane tetravinyl ether, glycerol trivinyl ether, pentaerythritol tetravinyl ether, dipentaerythritol pentavinyl ether, dipentaerythritol hexavinyl ether, EO-modified trimethylolpropane trivinyl ether, PO adduct trimethylolpropane trivinyl ether, EO-modified ditrimethylolpropane tetravinyl ether, PO adduct ditrimethylolpropane tetravinyl ether, EO-modified pentaerythritol tetravinyl ether, PO adduct pentaerythritol tetravinyl ether, EO-modified dipentaerythritol hexavinyl ether, and PO adduct dipentaerythritol hexavinyl ether.

In the polymerizable monomer A, the ratio of a monofunctional polymerizable monomer is 30 mass % or more, preferably 50 mass % or more, more preferably 70 mass % or more, still more preferably 90 mass % or more. When, in the polymerizable monomer A, the ratio of a monofunctional polymerizable monomer is 30 mass % or more, residual stress due to shrinkage on curing does not become excessively high and the recorded image has high water resistance. The upper limit value of the ratio of a monofunctional polymerizable monomer in the polymerizable monomer A is not particularly limited and is, for example, 100 mass %.

Polymerizable Monomer A1

The polymerizable monomer A1 is a polymerizable monomer having a C log P value of 2.0 or less. The C log P value is calculated by the fragment method. The calculation software using the fragment method may be, for example, ChemDraw Professional 16.

The polymerizable monomer A1 has a C log P value of 2.0 or less, which means that the polymerizable monomer A1 has relatively high hydrophilicity. When the undercoat composition includes the polymerizable monomer A1 having a C log P value of 2.0 or less, the recorded image is easily peeled by alkali from the substrate. Thus, the recorded image has high alkali-peelability.

The polymerizable monomer A1 has a C log P value of, from the viewpoint of further improving the alkali-peelability, preferably 1.0 or less. When the polymerizable monomer A1 has a small C log P value, the polymerizable monomer A1 has high hydrophilicity and high peelability by alkali from the substrate is provided. The lower limit value of the C log P value is not particularly limited, but is, from the viewpoint of ensuring water resistance, for example, 0.1.

The polymerizable monomer A1 may be a monofunctional polymerizable monomer or a polyfunctional polymerizable monomer, is preferably at least one of a monofunctional polymerizable monomer or a bifunctional polymerizable monomer, more preferably a monofunctional polymerizable monomer. When the polymerizable monomer A1 is a monofunctional polymerizable monomer or a bifunctional polymerizable monomer, the hydrophilicity of the polymerizable monomer A1 improves the alkali-peelability. In particular, when the polymerizable monomer A1 is a monofunctional polymerizable monomer, upon polymerization, the polymerizable monomer A1 is positioned at an end of the polymer, so that the hydrophilicity of the polymerizable monomer A1 further improves the alkali-peelability.

The polymerizable monomer A1 preferably, from the viewpoint of further improving the alkali-peelability, has a C log P value of 1.0 or less and is a monofunctional polymerizable monomer.

The polymerizable monomer A1, from the viewpoint of odor and safety, preferably has a molecular weight of 150 or more, more preferably 200 or more. The upper limit value of the molecular weight of the polymerizable monomer A1 is less than 1000. When the compound has a molecular weight of less than 1000, high ink jet ejectability is provided. For the molecular weight, from the types and numbers of constituent elements of the compound, the molecular weight can be calculated. Note that, from the viewpoint of odor, polymerizable monomers A other than the polymerizable monomer A1 also preferably have a molecular weight of 150 or more.

Specific examples of the polymerizable monomer A1 include, of the above-described specific examples the monofunctional polymerizable monomer and the polyfunctional polymerizable monomer, monomers having a C log P value of 2.0 or less. Specific examples of the polymerizable monomer A1 will be described below. The polymerizable monomer A1 is not limited to the following specific examples.

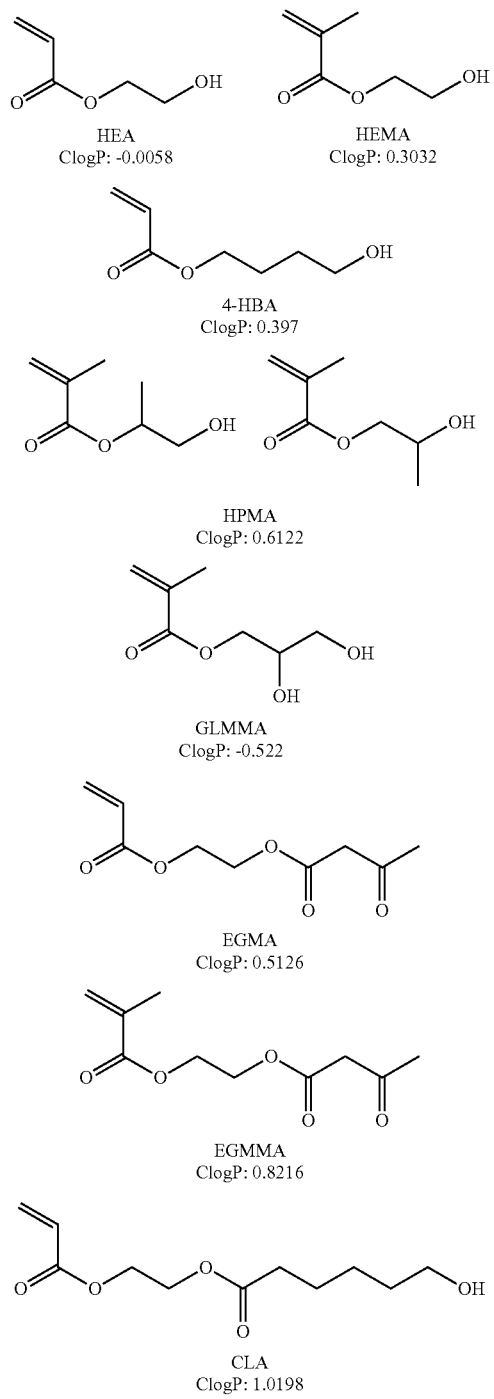

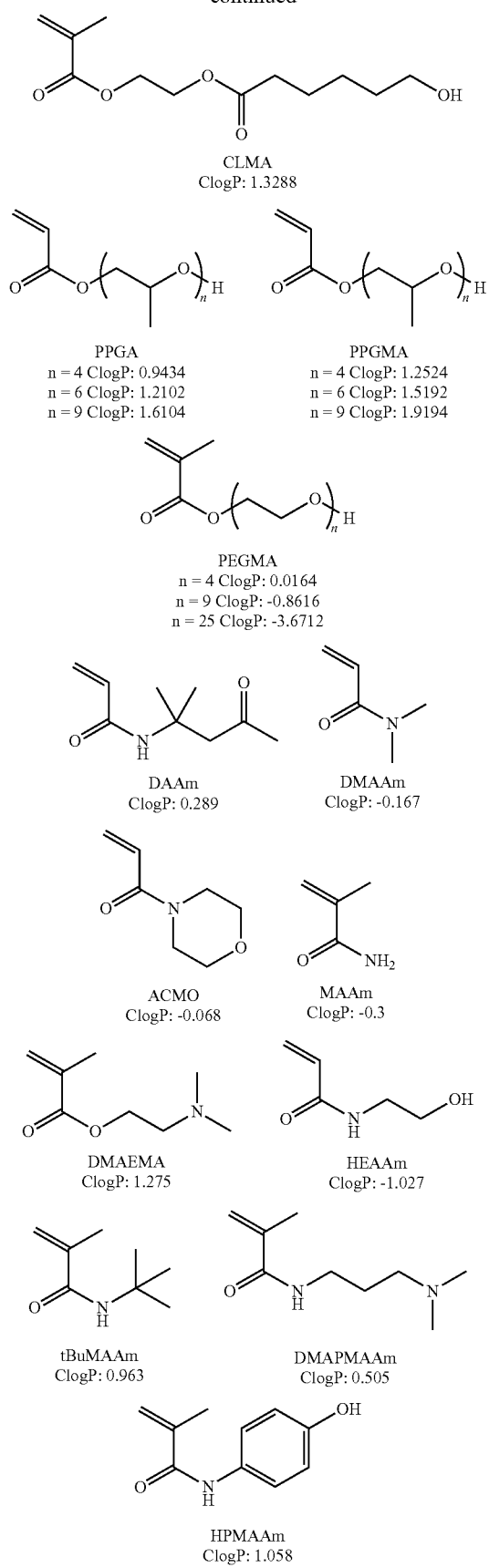
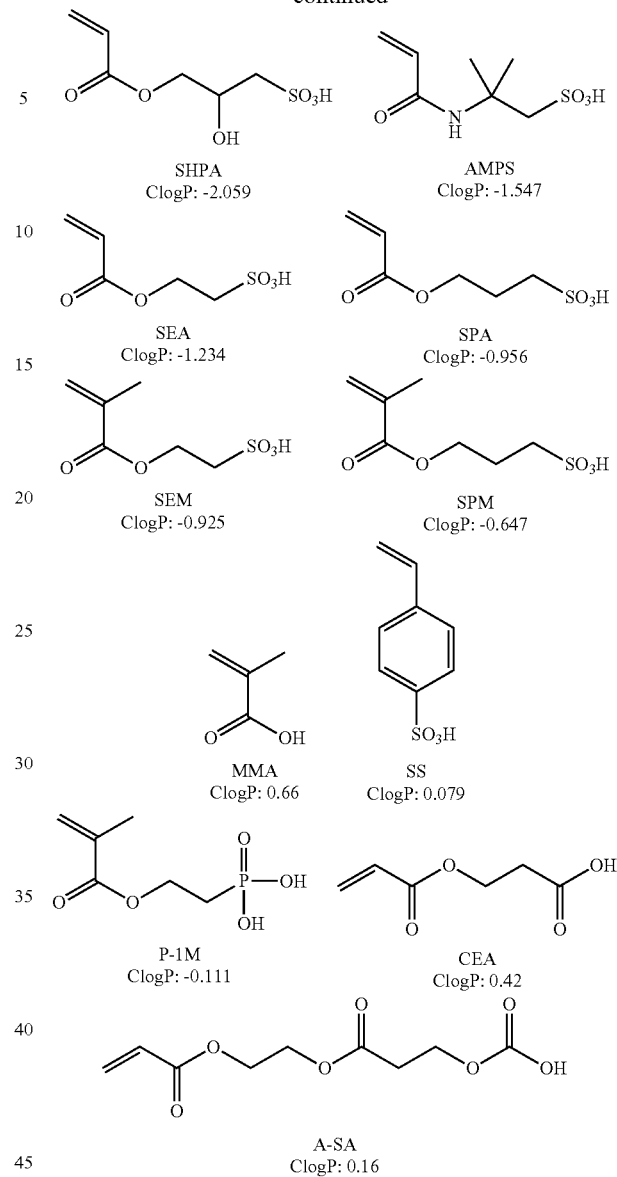

Other examples of the polymerizable monomer A1 include N-vinylcaprolactam, cyclic trimethylolpropane formal acrylate, tetrahydrofurfuryl acrylate, ethoxydiethylene glycol acrylate, carboxyethyl acrylate, 2-acryloyloxyethyl succinate, polyethylene glycol (200) diacrylate, polyethylene glycol (400) diacrylate, and pentaerythritol triacrylate.

The polymerizable monomer A1 is, from the viewpoint of decreasing the C log P value, preferably a (meth)acrylic compound or vinyl ether including at least one functional group selected from the group consisting of a cyclic ether, an acid group, a hydroxy group, an amide group, and an alkylene oxide group, more preferably a (meth)acrylic compound or vinyl ether having at least one functional group selected from the group consisting of an acid group, a hydroxy group, and an alkylene oxide group. Note that the (meth)acrylic compound means a compound having an acryloyl group (CH$_2$=CH—C(=O)—) or a methacryloyl group (CH$_2$=C(CH$_3$)—C(=O)—). The acrylic compound includes (meth)acrylates and (meth)acrylamide compounds.

The number of the carbon atoms included in the polymerizable monomer A1 is, from the viewpoint of bringing the cross-linking density into an appropriate range, preferably 5 to 30, more preferably 6 to 25, still more preferably 6 to 20. When the number of the carbon atoms included in the polymerizable monomer A1 is 5 or more, the cross-linking density does not become excessively high and higher alkali-peelability is provided. On the other hand, when the number of the carbon atoms included in the polymerizable monomer A1 is 30 or less, the cross-linking density does not become excessively low and higher water resistance is provided.

Examples of the (meth)acrylic compound or vinyl ether having a C log P value of 2.0 or less and having at least one functional group selected from the group consisting of a cyclic ether, an acid group, a hydroxy group, an amide group, and an alkylene oxide group include N-vinylcaprolactam, cyclic trimethylolpropane formal acrylate, tetrahydrofurfuryl acrylate, ethoxydiethylene glycol acrylate, hydroxyethyl acrylate, hydroxyethyl methacrylate, hydroxypropyl acrylate, 4-hydroxybutyl acrylate, 2-carboxyethyl acrylate, 2-acryloyloxyethyl succinate, polyethylene glycol (200) diacrylate, polyethylene glycol (400) diacrylate, and pentaerythritol triacrylate.

The polymerizable monomer A1 content relative to the total amount of the polymerizable monomer A is preferably 5 mass % to 40 mass %. When the content is 5 mass % or more, the recorded image has improved alkali-peelability. On the other hand, when the content is 40 mass % or less, the recorded image has improved water resistance.

The polymerizable monomer A1 preferably includes a polymerizable monomer having an acid group (hereafter, polymerizable monomer A11). The polymerizable monomer A11 is a polymerizable monomer having a C log P value of 2.0 or less and having an acid group. The polymerizable monomer A1 is preferably the polymerizable monomer A11 or a combination of the polymerizable monomer A11 and the polymerizable monomer A1 not having an acid group.

Examples of the acid group include a carboxy group, a sulfo group, a phosphonic acid group, a phosphoric acid group, and a sulfonamide group. In particular, the acid group is preferably a carboxy group.

The polymerizable monomer A11 is, from the viewpoint of further decreasing the C log P value, preferably a (meth) acrylic compound or vinyl ether having at least one functional group selected from the group consisting of a cyclic ether, a hydroxy group, an amide group, and an alkylene oxide group, and including an acid group.

When the undercoat composition includes the polymerizable monomer A11 (specifically, "polymerizable monomer having a C log P value of 2.0 or less and having an acid group"), higher alkali-peelability and higher water resistance are provided. This is because the acid group reacts with alkali to form salt, which improves the water solubility, resulting in improved peelability. On the other hand, in water, the acid group is maintained in its form, to provide water resistance inferentially.

Preferred examples of the polymerizable monomer A11 include the compounds described above as specific examples. Specifically, the polymerizable monomer A11 is preferably SHPA (2-hydroxy-3-sulfopropyl acrylate, AMPS (2-acrylamide-2-methylpropanesulfonic acid), SEA (2-sulfoethyl acrylate), SPA (3-sulfopropyl acrylate), SEM (2-sulfoethyl methacrylate), SPM (3-sulfopropyl methacrylate), MMA (methacrylic acid), SS (4-styrenesulfonic acid), P-1M (2-phosphonooxyethyl methacrylate), CEA (2-carboxyethyl acrylate), or A-SA (2-acryloyloxyethyl succinate), more preferably CEA or A-SA.

When the undercoat composition includes the polymerizable monomer A11, the polymerizable monomer A11 content relative to the total amount of the polymerizable monomer A is preferably 3 mass % to 30 mass %, more preferably 8 mass % to 20 mass %.

Bifunctional Polymerizable Monomer A2

The polymerizable monomer A preferably further includes, in addition to the polymerizable monomer A1, a bifunctional polymerizable monomer having at least one of a branched structure or an alicyclic structure (hereafter, bifunctional polymerizable monomer A2). In the case of including the bifunctional polymerizable monomer A2 having at least one of a branched structure or an alicyclic structure, steric hindrance expands the cross-linked structure, so that the recorded image has improved alkali-peelability and improved water resistance.

The branched structure means a structure intramolecularly having at least one of a tertiary carbon atom or a quaternary carbon atom. Specifically, examples of the molecular skeleton having the branched structure include a trimethylolpropane skeleton, a pentaerythritol skeleton, a dipentaerythritol skeleton, a propylene glycol skeleton, a neopentyl glycol skeleton, a sorbitol skeleton, and a glycerol skeleton.

Examples of the bifunctional polymerizable monomer A2 having at least one of the branched structure or an alicyclic structure include bifunctional (meth)acrylates such as 3-methyl-1,5-pentanediol di(meth)acrylate, glycerol di(meth)acrylate, pentaerythritol di(meth)acrylate, ethylene glycol diglycidyl ether di(meth)acrylate, diethylene glycol diglycidyl ether di(meth)acrylate, propylene glycol di(meth)acrylate, dipropylene glycol di(meth)acrylate, tripropylene glycol di(meth)acrylate, tricyclodecanedimethanol di(meth) acrylate, neopentyl glycol di(meth)acrylate, EO-modified neopentyl glycol di(meth)acrylate, and PO-modified neopentyl glycol di(meth)acrylate; and bifunctional divinyl ethers such as 1,4-cyclohexanedimethanol divinyl ether.

In particular, the bifunctional polymerizable monomer A2 is preferably at least one selected from the group consisting of 3-methyl-1,5-pentanediol di(meth)acrylate, tripropylene glycol di(meth)acrylate, tricyclodecanedimethanol di(meth) acrylate, and PO-modified neopentyl glycol di(meth)acrylate.

When the undercoat composition includes the bifunctional polymerizable monomer A2, from the viewpoint of improving the alkali-peelability and the water resistance, the bifunctional polymerizable monomer A2 content relative to the total amount of the polymerizable monomer A is preferably 2 mass % to 90 mass %, more preferably 3 mass % to 20 mass %, still more preferably 3 mass % to 10 mass %.

The undercoat composition has a polymerizable monomer A content of, relative to the total amount of the undercoat composition, preferably 50 mass % to 99 mass %, more preferably 70 mass % to 98 mass %, still more preferably 80 mass % to 97 mass %. Note that, when the undercoat composition includes a coloring agent described later (for example, a white pigment), the undercoat composition more preferably has a polymerizable monomer A content of, relative to the total amount of the undercoat composition, 60 mass % to 80 mass %.

Hereinafter, as another embodiment, an embodiment in which the undercoat composition contains an alkali-soluble polymer will be described.

Specific Polymer

In an ink set according to an embodiment of the present disclosure, the undercoat composition may contain an alkali-soluble polymer (hereafter, referred to as "specific polymer"). The alkali-soluble polymer is a polymer having solubility in alkali solutions and refers to a compound having a molecular weight of 1,000 or more. When the undercoat composition includes the alkali-soluble polymer, the recorded image is easily peeled by alkali from the substrate. Thus, the recorded image has high alkali-peelability. The undercoat composition according to the present disclosure may include, instead of the polymerizable monomer A, an alkali-soluble polymer, or may include, in addition to the polymerizable monomer A, an alkali-soluble polymer.

Being alkali-soluble can be confirmed using, as the alkali solution, an aqueous solution. In the case of being alkali-soluble, the image recorded on the recording medium is, upon in contact with the alkali solution, easily peeled from the surface of the substrate (hereafter, also referred to as alkali-peelability). Being alkali-soluble means that 0.1 g or more is dissolved at 85° C. in 100 mL of a 1.5 mass % aqueous sodium hydroxide solution.

The alkali-soluble polymer may be a polymer having, in the main chain or a side chain, at least one selected from the group consisting of a urethane bond, an ether bond, an ester bond, a phosphodiester bond, an amide bond, a phenolic hydroxy group, an acid group, and an acid anhydride-derived structure.

Examples of the acid group include a carboxy group, a sulfo group, a phosphonic acid group, a phosphoric acid group, and a sulfonamide group. In particular, the acid group is preferably a carboxy group. Examples of the acid anhydride-derived structure include an acetic anhydride-derived structure and a phosphoric acid-derived structure.

In a preferred embodiment, the undercoat composition contains, as the alkali-soluble polymer, a polymer having an acid group. The polymer having an acid group has high hydrophilicity, and forms, together with the alkali solution, alkali salt to become more hydrophilic. Thus, it becomes more dissolvable in the alkali solution and, as a result, becomes less peelable by water, so that the water resistance is expected to be improved.

Examples of the specific polymer include (meth)acrylic copolymers, polyurethane, polyvinyl alcohol, polyvinyl butyral, polyvinyl formal, polyamide, polyester, and epoxy resin. In particular, the specific polymer is preferably a (meth)acrylic copolymer, polyurethane, or polyvinyl butyral.

The (meth)acrylic copolymer refers to a copolymer including, as a structural unit, a (meth)acrylic-based monomer such as (meth)acrylic acid, a (meth)acrylic acid ester (for example, a (meth)acrylic acid alkyl ester, a (meth) acrylic acid aryl ester, or a (meth)acrylic acid allyl ester), (meth)acrylamide, or a (meth)acrylamide derivative.

Specific examples include a copolymer formed by copolymerization of one or two or more monomers selected from the group consisting of (meth)acrylic-based monomers [for example, (meth)acrylic acid esters (for example, hydroxyethyl (meth)acrylate)], nitrile-based monomers (for example, (meth)acrylonitrile), amide-based monomers (for example, (meth)acrylamide), N-alkoxy-substituted amide-based monomers, N-methylol-substituted amide-based monomers, styrene-based monomers (for example, styrene, vinyltoluene, α-methylstyrene, and divinylbenzene), allyl-based monomers (for example, diallyl phthalate, allyl glycidyl ether, and triallyl isocyanurate), and monomers having a polymerizable double bond (for example, vinyl acetate and N-vinylpyrrolidone), and one or two or more monomers selected from the group consisting of unsaturated carboxylic acids having a carboxy group [for example, (meth)acrylic acid, maleic acid, maleic anhydride, fumaric acid, tetrahydrophthalic anhydride, and itaconic acid].

The polyurethane refers to a polymer obtained by a condensation reaction between a polyfunctional isocyanate compound having two or more isocyanate groups and a polyhydric alcohol having two or more hydroxy groups.

The polyvinyl butyral refers to a polymer obtained by reacting polyvinyl alcohol obtained by partially or completely saponifying polyvinyl acetate, and butyraldehyde under acidic conditions.

The polyvinyl butyral also includes polymers in which a functional group is intramolecularly introduced.

The (meth)acrylic copolymer preferably includes a structural unit having an acid group. Examples of the acid group include a carboxy group, a sulfo group, a phosphonic acid group, a phosphoric acid group, and a sulfonamide group. In particular, the acid group is preferably a carboxy group. Examples of the structural unit having a carboxy group include a structural unit derived from (meth)acrylic acid and a structural unit represented by the following Formula 1.

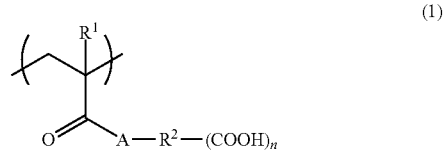

In Formula 1, $R^1$ represents a hydrogen atom or a methyl group, and $R^2$ represents a single bond or an n+1-valent coupling group. A represents an oxygen atom or $—NR^3—$, and $R^3$ represents a hydrogen atom or a monovalent hydrocarbon group having 1 to 10 carbon atoms. n represents an integer of 1 to 5.

For preferred examples and specific examples of the structural unit represented by Formula 1 and preferred examples of structural units other than the structural unit represented by Formula 1, reference can be made to JP4668111B and JP5588887B.

The specific polymer is preferably a radical-polymerizable compound having a radical-polymerizable group (also simply referred to as polymerizable group). It has a radical-polymerizable group, to thereby form intramolecularly a cross-linked structure. The specific polymer has a cross-linked structure, to thereby provide images having improved water resistance. When the specific polymer has an acid group and a radical-polymerizable group, it has the acid group, so that, upon contact with an alkali solution, it undergoes acid dissociation to facilitate entry of the alkali solution to provide high alkali-peelability, and it has the cross-linked structure, so that the image has improved water resistance inferentially. Thus, achievement of both of alkali-peelability and water resistance is facilitated.

The specific polymer is, of radical-polymerizable compounds, preferably a radical-polymerizable compound having a monomer unit selected from the group consisting of a monofunctional monomer-derived structural unit and a polyfunctional monomer-derived structural unit.

Specific examples of the monofunctional monomer-derived structural unit and the polyfunctional monomer-derived structural unit include compounds the same as those described above in "Monofunctional polymerizable monomer" and "Polyfunctional polymerizable monomer" in the polymerizable monomer A.

The number of the radical-polymerizable groups in a single molecule of the radical-polymerizable compound (the number of the functional groups) is preferably 2 to 4. When the number of the functional groups is 2 or more, the recorded image has higher water resistance. When the number of the functional groups is 4 or less, the cross-linked structure does not become excessively dense and the stress due to shrinkage on curing is further suppressed, so that unintended peeling from the substrate tends to be suppressed inferentially.

The specific polymer may be a commercially available product on the market. Specific examples of the commercially available product include SMA17352P manufactured by KAWAHARA PETROCHEMICAL CO., LTD. (styrene-maleic anhydride copolymer), NeoCryl series manufactured by Kusumoto Chemicals, Ltd. (for example, NeoCryl BT20; acrylic polymer), UREARNO series manufactured by ARAKAWA CHEMICAL INDUSTRIES, LTD. (for example, UREARNO KL424; polyurethane), acid-modified acrylates manufactured by Sartomer Japan Inc. (for example, SB404 and SB520M35), and CYCLOMER P series manufactured by DAICEL-ALLNEX LTD. (for example, CYCLOMER P Z200M (average molecular weight: 12000) and CYCLOMER P Z254F (average molecular weight: 21000); acid group-containing acrylic polymers).

The specific polymer preferably has a weight-average molecular weight of 1,000 to 1,000,000, more preferably 5,000 to 500,000, still more preferably 10,000 to 200,000. The weight-average molecular weight means a value measured by gel permeation chromatography (GPC). The measurement by gel permeation chromatography (GPC) is performed using a measurement instrument that is HLC (registered trademark)-8020GPC (manufactured by Tosoh Corporation), three columns of TSKgel (registered trademark) Super Multipore HZ-H (4.6 mmID×15 cm, manufactured by Tosoh Corporation), and an eluant that is THF (tetrahydrofuran). The measurement is performed at a sample concentration of 0.45 mass %, at a flow rate of 0.35 ml/min, at a sample injection amount of 10 µl, at a measurement temperature of 40° C., using an RI detector. The calibration curve is created using "standard samples TSK standard, polystyrene" manufactured by Tosoh Corporation: 8 samples of "F-40", "F-20", "F-4", "F-1", "A-5000", "A-2500", "A-1000", and "n-propylbenzene".

When the undercoat composition contains the specific polymer, the undercoat composition has a specific polymer content of 1 mass % or more and 20 mass % or less. The undercoat composition preferably has a specific polymer content of 1 mass % to 10 mass %, more preferably 5 mass % to 10 mass %.

When the specific polymer content is within such a range, improved water resistance and improved alkali-peelability are provided inferentially for the following reasons. When the specific polymer content is 1 mass % or more, the recorded image has improved alkali-peelability. When the specific polymer content is 20 mass % or less, the recorded image has ensured alkali-peelability and the recorded image has effectively improved water resistance. Furthermore, when the specific polymer content is 10 mass % or less, in the case of containing an alkali-soluble polymer not having a polymerizable group, the image tends to maintain higher water resistance or, in the case of containing an alkali-soluble polymer having a polymerizable group, cross-linking does not become excessively dense and alkali-peelability tends to be maintained, and shrinkage on curing is also suppressed, so that the image tends to maintain higher water resistance. In addition, when the specific polymer content is within such a range, during ejection of ink by an ink jet process, higher ejection performance is provided.

Surfactant

The undercoat composition contains at least one surfactant. The surfactant is included, so that improved alkali-peelability is provided and, in the case of application by the ink jet recording process, improved ejection stability is provided.

Examples of the surfactant include those described in JP1987-173463A (JP-S62-173463A) and JP1987-183457A (JP-S62-183457A). Examples of the surfactant include anionic surfactants such as dialkylsulfosuccinic acid salts, alkylnaphthalenesulfonic acid salts, and fatty acid salts; nonionic surfactants such as polyoxyethylene alkyl ether, polyoxyethylene alkylaryl ether, acetylene glycol, and polyoxyethylene-polyoxypropylene block copolymers; and cationic surfactants such as alkylamine salts and quaternary ammonium salts. Alternatively, the surfactant may be a fluorine-based surfactant or a silicone-based surfactant.

In the present disclosure, from the viewpoint of alkali-peelability and ejection stability during recording by an ink jet recording process, the surfactant is preferably a silicone-based surfactant. The silicone-based surfactant may be, for example, a polysiloxane compound. The silicone-based surfactant is preferably a modified polysiloxane compound in which, to some of the methyl groups of dimethylpolysiloxane, organic groups are introduced. Examples of the modification include polyether modification, methylstyrene modification, alcohol modification, alkyl modification, aralkyl modification, fatty acid ester modification, epoxy modification, amine modification, amino modification, and mercapto modification. To some of the methyl groups of dimethylpolysiloxane, a plurality of organic group species may be introduced. In particular, from the viewpoint of alkali-peelability and ejection stability, the silicone-based surfactant is preferably a polyether-modified polysiloxane compound.

Examples of the polyether-modified polysiloxane compound include SILWET L-7604, SILWET L-7607N, SILWET FZ-2104, and SILWET FZ-2161 (manufactured by Momentive Performance Materials Japan LLC); BYK306, BYK307, BYK331, BYK333, BYK347, and BYK348 (manufactured by BYK Chemie GmbH); and KF-351A, KF-352A, KF-353, KF-354L, KF-355A, KF-615A, KF-945, KF-640, KF-642, KF-643, KF-6020, X-22-6191, X-22-4515, KF-6011, KF-6012, KF-6015, and KF-6017 (manufactured by Shin-Etsu Chemical Co., Ltd.).

In the undercoat composition, the surfactant content relative to the total amount of the undercoat composition is preferably 0.001 mass % to 4.0 mass %, more preferably 0.01 mass % to 3.0 mass %, still more preferably 0.05 mass % to 2.0 mass %.

Isocyanate Compound

In the ink set according to the present disclosure, the undercoat composition has an isocyanate compound content of, relative to the total amount of the undercoat composition, less than 10 mass %. The isocyanate compound in the undercoat composition reacts with water to form urea bonds, to form, together with hydroxy groups in the surface of the substrate, hydrogen bonds. The isocyanate compound reacts with hydroxy groups in the surface of the substrate to form urethane bonds. Formation of these tends to result in an increase in the adhesiveness to the substrate. Thus, from the viewpoint of ensuring the alkali-peelability of the recorded image, the undercoat composition preferably has a low isocyanate compound content. When the undercoat composition has an isocyanate compound content of, relative to the total amount of the undercoat composition, less than 10 mass %, the recorded image has high alkali-peelability. The isocyanate compound content is preferably 5 mass % or less, more preferably 2 mass % or less, still more preferably 0 mass %. In other words, the undercoat composition preferably does not include the isocyanate compound.

When the undercoat composition includes an isocyanate compound, the isocyanate compound is not particularly limited as long as it is a compound having an isocyanate group, but is, from the viewpoint of ensuring alkali-peelability and increasing the adhesiveness to the substrate, preferably a polyfunctional isocyanate compound having, in a single molecule, two or more isocyanate groups.

Examples of a bifunctional isocyanate compound having, in a single molecule, two isocyanate groups include aliphatic diisocyanates such as methylene diisocyanate, dimethylene diisocyanate, trimethylene diisocyanate, tetramethylene diisocyanate, pentamethylene diisocyanate, hexamethylene diisocyanate, dipropyl ether diisocyanate, 2,2-dimethylpentane diisocyanate, 3-methoxyhexane diisocyanate, octamethylene diisocyanate, 2,2,4-trimethylpentane diisocyanate, nonamethylene diisocyanate, decamethylene diisocyanate, 3-butoxyhexane diisocyanate, 1,4-butylene glycol dipropyl ether diisocyanate, and thiodihexyl diisocyanate;

aromatic diisocyanates such as m-phenylene diisocyanate, p-phenylene diisocyanate, 2,4-tolylene diisocyanate, 2,6-tolylene diisocyanate, dimethylbenzene diisocyanate, ethylbenzene diisocyanate, isopropylbenzene diisocyanate, tolidine diisocyanate, 1,4-naphthalene diisocyanate, 1,5-naphthalene diisocyanate, 2,6-naphthalene diisocyanate, 2,7-naphthalene diisocyanate, m-xylylene diisocyanate, p-xylylene diisocyanate, and tetramethylxylylene diisocyanate; and alicyclic diisocyanates such as hydrogenated xylylene diisocyanate, isophorone diisocyanate, and dicyclohexylmethane 4,4'-diisocyanate.

The isocyanate compound may be a biuret or isocyanurate that is a trimer of a bifunctional isocyanate compound, may be an addition product of a polyol such as trimethylolpropane and a bifunctional isocyanate compound (namely, an adduct), or may be an addition product of an alcohol such as methanol and a bifunctional isocyanate compound (namely, an allophanate).

The isocyanate compound may be a commercially available product on the market. Examples of the commercially available product include TAKENATE series such as TAKENATE D103H, D204, D160N, D170N, D165N, D178NL, and D110N (manufactured by Mitsui Chemicals, Inc.), and CORONATE HX, HXR, HXL, HXLV, HK, HK-T, HL, and 2096 (manufactured by Nippon Polyurethane Industry Co., Ltd.).

The undercoat composition may include a single isocyanate compound alone or may include two or more isocyanate compounds.

In the present disclosure, the undercoat composition may include another component other than the polymerizable monomer A and the specific polymer. Examples of the other component include a polymerization initiator, a surfactant, and additives.

Polymerization Initiator

The undercoat composition may contain at least one polymerization initiator. The polymerization initiator is preferably a radical polymerization initiator that generates a radical.

Examples of the radical polymerization initiator include (a) an alkylphenone compound, (b) an acylphosphine oxide compound, (c) an aromatic onium salt compound, (d) an organic peroxide, (e) a thio compound, (f) a hexaaryl biimidazole compound, (g) a ketoxime ester compound, (h) a borate compound, (i) an azinium compound, (j) a metallocene compound, (k) an active ester compound, (l) a compound having a carbon-halogen bond, and (m) an alkylamine compound.

The radical polymerization initiator is preferably (b) an acylphosphine oxide compound.

Examples of the acylphosphine oxide compound include bis(2,4,6-trimethylbenzoyl)phenylphosphine oxide, bis(2,6-dimethylbenzoyl)phenylphosphine oxide, bis(2,4,6-trimethylbenzoyl)-2-methoxyphenylphosphine oxide, bis(2,6-dimethylbenzoyl)-2-methoxyphenylphosphine oxide, bis(2,4,6-trimethylbenzoyl)-2,4-dimethoxyphenylphosphine oxide, bis(2,6-dimethylbenzoyl)-2,4-dimethoxyphenylphosphine oxide, bis(2,4,6-trimethylbenzoyl)-2,4-dipentyloxyphenylphosphine oxide, bis(2,6-dimethylbenzoyl)-2,4-dipentyloxyphenylphosphine oxide, 2,4,6-trimethylbenzoylethoxyphenylphosphine oxide, 2,6-dimethylbenzoylethoxyphenylphosphine oxide, 2,4,6-trimethylbenzoylmethoxyphenylphosphine oxide, bis(2,6-dimethoxybenzoyl)-2,4,4-trimethylpentylphenylphosphine oxide, 2,4,6-trimethylbenzoyldiphenylphosphine oxide, 2,6-dimethylbenzoylmethoxyphenylphosphine oxide, 2,4,6-trimethylbenzoyl(4-pentyloxyphenyl)phenylphosphine oxide, and 2,6-dimethylbenzoyl(4-pentyloxyphenyl)phenylphosphine oxide.

In particular, the acylphosphine oxide compound is preferably bis(2,4,6-trimethylbenzoyl)phenylphosphine oxide or 2,4,6-trimethylbenzoyldiphenylphosphine oxide, more preferably bis(2,4,6-trimethylbenzoyl)phenylphosphine oxide. Bis(2,4,6-trimethylbenzoyl)phenylphosphine oxide is available under product name "Omnirad819" from IGM Resins B. V.

In the undercoat composition, the polymerization initiator content relative to the total amount of the undercoat composition is preferably 1.0 mass % to 15.0 mass %, more preferably 1.5 mass % to 10.0 mass %, still more preferably 2.0 mass % to 6.0 mass %.

Additives

The undercoat composition may contain, as needed, additives such as a co-sensitizer, an ultraviolet absorbent, an antioxidant, an anti-fading agent, a conductive salt, a solvent, a basic compound, and a metallic compound. The undercoat composition may contain a coloring agent, but preferably does not contain coloring agents. When the undercoat composition contains a coloring agent, the coloring agent is preferably an achromatic coloring agent, more preferably a white coloring agent. The coloring agent may be a coloring agent the same as that described later and included in the ink. When the undercoat composition contains a coloring agent, the undercoat composition has a coloring agent content of, relative to the total amount of the undercoat composition, preferably 0.01 mass % to 30 mass %, more preferably 7 mass % to 18 mass %. The undercoat composition may contain a brilliant pigment in order to provide decoration.

When the undercoat composition contains the specific polymer, the undercoat composition may further contain a polymerizable monomer having a C log P value of more than 2.0. Examples of the polymerizable monomer having a C log P value of more than 2.0 include, of the above-described monofunctional polymerizable monomers and polyfunctional polymerizable monomers in the section of Polymerizable monomer A, monomers having a C log P value of more than 2.0.

In the undercoat composition, the content of the polymerizable monomer having a C log P value of more than 2.0 relative to the total amount of the undercoat composition is preferably 50 mass % to 98 mass %, more preferably 60 mass % to 97 mass %, still more preferably 80 mass % to 95 mass %.

Properties

The undercoat composition has a pH of, from the viewpoint of, in the case of application using an ink jet recording process, improving the ejection stability, preferably 7 to 10, more preferably 7.5 to 9.5. The pH is measured using a pH meter at 25° C. and is measured using, for example, a pH meter (model "HM-31") manufactured by DKK-TOA CORPORATION.

The undercoat composition preferably has a viscosity of 0.5 mPa·s to 30 mPa·s, more preferably 2 mPa·s to 20 mPa·s, preferably 2 mPa·s to 15 mPa·s, more preferably 3 mPa·s to 10 mPa·s. The viscosity is measured using a viscometer at 25° C. and is measured using, for example, a TV-22 viscometer manufactured by Toki Sangyo Co., Ltd.

The undercoat composition has a surface tension of preferably 60 mN/m or less, more preferably 20 mN/m to 50 mN/m, still more preferably 25 mN/m to 45 mN/m. The surface tension is measured using a surface tensiometer at 25° C. and is measured using, for example, an Automatic Surface Tensiometer (product name "CBVP-Z") manufactured by Kyowa Interface Science Co., Ltd. by the plate method.

Ink

In the present disclosure, the ink includes a polymerizable compound B. In the present disclosure, the polymerizable compound included in the ink is referred to as "polymerizable compound B". The ink may include a single polymerizable compound B alone or may include two or more polymerizable compounds B.

Polymerizable Compound B

In the polymerizable compound B, the polymerizable group may be a cationic-polymerizable group or a radical-polymerizable group, but is, from the viewpoint of curability, preferably a radical-polymerizable group. The radical-polymerizable group is, from the viewpoint of curability, preferably an ethylenically unsaturated group.

The polymerizable compound B may be a monofunctional polymerizable compound or a polyfunctional polymerizable compound. Examples of the monofunctional polymerizable compound and the polyfunctional polymerizable compound include the monofunctional polymerizable monomers and the polyfunctional polymerizable monomers described in the section of Polymerizable monomer A.

In the present disclosure, the ink has a tri- or higher functional polymerizable compound content of, relative to the total amount of the polymerizable compound B, less than 10 mass %. When the ink has a tri- or higher functional polymerizable compound content of, relative to the total amount of the polymerizable compound B, less than 10 mass %, curing does not result in an excessively high cross-linking density and alkali appropriately enters the ink layer and the undercoat layer inferentially. Thus, the recorded image has high alkali-peelability.

From the viewpoint of further improving the alkali-peelability of the recorded image, the ink has a tri- or higher functional polymerizable compound content of, relative to the total amount of the polymerizable compound B, preferably 5 mass % or less, more preferably 3 mass % or less. In the ink, the tri- or higher functional polymerizable compound content may be 0 mass %, but is, from the viewpoint of providing a recorded image having further improved water resistance, preferably 1 mass % or more.

In the polymerizable compound B, the ratio of a bifunctional polymerizable compound is preferably 50 mass % or more, more preferably 75 mass % or more, still more preferably 90 mass % or more. The upper limit value of the ratio of a bifunctional polymerizable compound in the polymerizable compound B is not particularly limited and the ratio may be 100 mass %. In other words, the polymerizable compound B may be entirely a bifunctional polymerizable compound. When, in the polymerizable compound B, the ratio of a bifunctional polymerizable compound is 50 mass % or more, shrinkage on curing causes a high residual stress, to provide improved alkali-peelability. In addition, when, in the polymerizable compound B, the ratio of a bifunctional polymerizable compound is 50 mass % or more, the cross-linking density is relatively high, to provide improved water resistance.

In the polymerizable compound B, the mass-ratio-based weighted mean of the number of the functional groups per unit molecular weight is 0.65 or more. The unit molecular weight is defined as 100. The weighted mean is calculated, for example, in the following manner.

First, for each of the polymerizable compounds B included in the ink, the following formula is used to calculate the number of functional groups per unit molecular weight.

Number of functional groups per unit molecular weight=(Number of functional groups of polymerizable compound $B$)/(Molecular weight of polymerizable compound $B$)×100

Subsequently, such obtained values are used, on the basis of contents (mass %) of the polymerizable compounds B, to calculate the mean. The contents of the polymerizable compounds B are the contents relative to the total amount of the polymerizable compounds B. Specifically, the weighted mean is calculated by the following formula.

Weighted mean=Σ(Number of functional groups per unit molecular weight)×(Content)/100

The inventors of the present invention focused on change in shrinkage on curing in response to the number of the functional groups of the polymerizable compound B and the molecular weight of the polymerizable compound B. When the weighted mean is 0.65 or more, cross-linking causes shrinkage on curing to generate residual stress, so that the recorded image is easily peeled by alkali from the substrate inferentially. When the weighted mean is 0.65 or more, polymerization of the polymerizable compound B forms a cross-linked structure, so that the ink layer resists entry of water and has high water resistance inferentially.

In the polymerizable compound B, the mass-ratio-based weighted mean of the number of the functional groups per unit molecular weight is preferably 0.65 or more, more preferably 0.80 or more. The upper limit value of the weighted mean is not particularly limited. However, in the present disclosure, the ink has a tri- or higher functional polymerizable compound content of, relative to the total amount of the polymerizable compound B, less than 10 mass %, and hence the weighted mean is limited to some degree. The upper limit value of the weighted mean is, for example, 0.90.

The polymerizable compound B has, from the viewpoint of odor, a molecular weight of preferably 200 or more. The upper limit value of the molecular weight is not particularly limited, but is, from the viewpoint of ejection stability during recording by an ink jet recording process, for example, 600. In the case of a compound having a molecular weight of less than 1000, the molecular weight can be calculated from the types and the numbers of the elements constituting the compound.

The polymerizable compound B preferably includes a polymerizable compound having a C log P value of 1.5 or less (hereafter, referred to as "polymerizable compound B1"). Examples of the polymerizable compound having a C log P value of 1.5 or less include, of the above-described monofunctional polymerizable monomers and polyfunctional polymerizable monomers in the section of Polymerizable monomer A, those having a C log P value of 1.5 or less. Examples of the polymerizable compound having a C log P value of 1.5 or less include tetrahydrofurfuryl acrylate, ethoxydiethylene glycol acrylate, 4-hydroxybutyl acrylate, carboxyethyl acrylate, 2-acryloyloxyethyl succinate, polyethylene glycol (400) diacrylate, and pentaerythritol triacrylate.

The polymerizable compound B1 is, from the viewpoint of decreasing the C log P value, preferably a (meth)acrylic compound or vinyl ether including at least one functional group selected from the group consisting of a cyclic ether, an acid group, a hydroxy group, an amide group, and an alkylene oxide group, more preferably a (meth)acrylic compound or vinyl ether having at least one functional group selected from the group consisting of an acid group, a hydroxy group, and an alkylene oxide group. The number of carbon atoms included in the polymerizable compound B1 is, from the viewpoint of bringing the cross-linking density into an appropriate range, preferably 5 to 30, more preferably 6 to 25, still more preferably 6 to 20. When the number of carbon atoms included in the polymerizable compound B1 is 5 or more, the cross-linking density does not become excessively high and higher alkali-peelability is provided. On the other hand, when the number of carbon atoms included in the polymerizable compound B1 is 30 or less, the cross-linking density does not become excessively low and higher water resistance is provided.

Examples of the (meth)acrylic compound having a C log P value of 1.5 or less and having at least one functional group selected from the group consisting of a cyclic ether, an acid group, a hydroxy group, an amide group, and an alkylene oxide group include tetrahydrofurfuryl acrylate, ethoxydiethylene glycol acrylate, hydroxyethyl acrylate, hydroxyethyl methacrylate, hydroxypropyl acrylate, 4-hydroxybutyl acrylate, polyethylene glycol (400) diacrylate, and pentaerythritol triacrylate.

When the ink includes the polymerizable compound B1, the polymerizable compound B1 content relative to the total amount of the polymerizable compound B is preferably 1 mass % to 30 mass %, more preferably 2 mass % to 15 mass %, still more preferably 3 mass % to 8 mass %. Polymerizable compounds having a C log P value of 1.0 or less have high hydrophilicity. When the polymerizable compound B1 content is 1 mass % or more, the hydrophilicity of the polymerizable compound B1 provides improved alkali-peelability. On the other hand, when the polymerizable compound B1 content is 30 mass % or less, water resistance is ensured.

The ink has a polymerizable compound B content of, relative to the total amount of the ink, preferably 50 mass % to 95 mass %, more preferably 70 mass % to 94 mass %.

Coloring Agent

The ink may contain a coloring agent.

Such coloring agents may be various coloring material compounds (also referred to as coloring materials), and examples include dyes and pigments. The coloring agent is, from the viewpoint of durability such as heat resistance, light resistance, and water resistance, preferably a pigment.

In the case of using, as the coloring agent, a pigment, the pigment can be contained in the form of a pigment dispersion liquid, in the ink. The pigment dispersion liquid is a liquid obtained by using a dispersing agent to disperse a pigment in a liquid medium, and at least includes the pigment, the dispersing agent, and the liquid medium. The dispersing agent will be described later in detail. The liquid medium may be an organic solvent or the polymerizable compound B.

The pigment may be ordinarily a commercially available organic pigment or inorganic pigment. Examples of the pigment include the pigments described in "Dictionary of pigments" edited by Seishiro Ito (published in 2000), W. Herbst, K. Hunger "Industrial Organic Pigments", JP2002-12607A, JP2002-188025A, JP2003-26978A, and JP2003-342503A.

As described later, in the case of recording, as an ink image, a dot code, the ink used for recording the dot code preferably contains, as a coloring agent, a yellow pigment, more preferably contains at least a yellow pigment having the maximum absorption wavelength in a wavelength region of 350 nm to 450 nm.

As the coloring material compound, an infrared absorption coloring material may also be employed. The infrared absorption coloring material contained in the ink further improves the invisibility (in other words, a property of being less likely to be visually seen) and infrared readability of the recorded ink image. Examples of the infrared absorption coloring material include organic coloring materials such as pyrrolopyrrole compounds, cyanine compounds, squarylium compounds, diimmonium compounds, phthalocyanine compounds, naphthalocyanine compounds, and oxonol compounds; and inorganic coloring materials such as lanthanum hexaborate ($LaB_6$), cesium tungsten oxide (CWO), indium tin oxide (ITO), and antimony tin oxide (ATO). For the coloring material compound, for example, reference can be made to descriptions in WO2020/059509A, WO2018/155173A, and WO2019/049626A.

The ink has a coloring agent content of, relative to the total amount of the ink, preferably 0.5 mass % to 15 mass %, more preferably 1 mass % to 12 mass %, still more preferably 2 mass % to 10 mass %.

The ink may include a single coloring agent alone or may include two or more coloring agents.

Dispersing Agent

In the case of using, as the coloring agent, a pigment, the pigment can be contained in the form of a pigment dispersion liquid, in the ink. The pigment can be dispersed using a dispersing agent in a liquid medium. The dispersing agent may be ordinarily a publicly known dispersing agent. The dispersing agent is, from the viewpoint of dispersion stability, preferably a compound having both of a hydrophilic structure and a hydrophobic structure.

Examples of the dispersing agent include low-molecular-weight dispersing agents having a molecular weight of less than 1000 such as higher fatty acid salts, alkyl sulfuric acid salts, alkyl ester sulfuric acid salts, alkyl sulfonic acid salts, sulfosuccinic acid salts, naphthalenesulfonic acid salts, alkyl phosphoric acid salts, polyoxyalkylene alkyl ether phosphoric acid salts, polyoxyalkylene alkyl phenyl ethers, polyoxyethylene polyoxypropylene glycol, glycerol fatty acid esters, sorbitan fatty acid esters, polyoxyethylene fatty acid amides, and amine oxides.

Other examples of the dispersing agent include a high-molecular-weight dispersing agent having a molecular weight of 1000 or more and obtained by copolymerizing a hydrophilic monomer and a hydrophobic monomer. The hydrophilic monomer is, from the viewpoint of dispersion stability, preferably a dissociable-group-containing monomer, preferably a dissociable-group-containing monomer having a dissociable group and an ethylenically unsaturated bond. The dissociable-group-containing monomer may be, for example, a carboxy-group-containing monomer, a sulfonic-acid-group-containing monomer, or a phosphoric-acid-group-containing monomer. The hydrophobic monomer is, from the viewpoint of dispersion stability, preferably an aromatic-group-containing monomer having an aromatic group and an ethylenically unsaturated bond, or an aliphatic-hydrocarbon-group-containing monomer having an aliphatic hydrocarbon group and an ethylenically unsaturated bond. The polymer may be a random copolymer or a block copolymer.

The dispersing agent may be a commercially available product. Examples of the commercially available product include DISPERBYK-101, DISPERBYK-102, DISPERBYK-103, DISPERBYK-106, DISPERBYK-110, DISPERBYK-111, DISPERBYK-161, DISPERBYK-162, DISPERBYK-163, DISPERBYK-164, DISPERBYK-166, DISPERBYK-167, DISPERBYK-168, DISPERBYK-170, DISPERBYK-171, DISPERBYK-174, DISPERBYK-182 (all are manufactured by BYK-Chemie GmbH); and SOLSPERSE3000, SOLSPERSE5000, SOLSPERSE9000, SOLSPERSE12000, SOLSPERSE13240, SOLSPERSE13940, SOLSPERSE17000, SOLSPERSE22000, SOLSPERSE24000, SOLSPERSE26000, SOLSPERSE28000, SOLSPERSE32000, SOLSPERSE36000, SOLSPERSE39000, SOLSPERSE41000, and SOLSPERSE71000 (all are manufactured by Lubrizol Corporation).

The dispersing device for dispersing the pigment may be a publicly known dispersing device; examples include a ball mill, a sand mill, a bead mill, a roll mill, a jet mill, a paint shaker, an attritor, an ultrasonic dispersing device, and a disper.

In the ink, the dispersing agent content relative to the pigment content is, from the viewpoint of dispersion stability, by mass, preferably 0.05 to 1.0, more preferably 0.1 to 0.5.

Polymerization Initiator

The ink may contain at least one polymerization initiator. The polymerization initiator is preferably a radical polymerization initiator that generates a radical.

Examples of the radical polymerization initiator include (a) an alkylphenone compound, (b) an acylphosphine oxide compound, (c) an aromatic onium salt compound, (d) an organic peroxide, (e) a thio compound, (f) a hexaaryl biimidazole compound, (g) a ketoxime ester compound, (h) a borate compound, (i) an azinium compound, (j) a metallocene compound, (k) an active ester compound, (l) a compound having a carbon-halogen bond, and (m) an alkylamine compound.

The radical polymerization initiator is preferably at least one selected from the group consisting of (b) an acylphosphine oxide compound and (e) a thio compound. The thio compound is preferably a thioxanthone compound having a thioxanthone skeleton; more preferably, as radical polymerization initiators, an acylphosphine oxide compound and a thioxanthone compound are used in combination.

In the ink, the polymerization initiator content relative to the total amount of the ink is preferably 1.0 mass % to 15.0 mass %, more preferably 1.5 mass % to 10.0 mass %, still more preferably 4.0 mass % to 8.0 mass %.

In the case of using the combination of an acylphosphine oxide compound and a thioxanthone compound, in the ink, the acylphosphine oxide compound content relative to the total amount of the ink is preferably 0.6 mass % to 9.0 mass %, more preferably 1.0 mass % to 6.0 mass %, still more preferably 3.0 mass % to 5.0 mass %. In the ink, the thioxanthone compound content relative to the total amount of the ink is preferably 0.4 mass % to 6.0 mass %, more preferably 0.5 mass % to 4.0 mass %, still more preferably 1.0 mass % to 3.0 mass %.

Surfactant

The ink, from the viewpoint of, in the case of application using an ink jet recording process, improving the ejection stability, may contain at least one surfactant. Specific examples of the surfactant are the same as those described above.

In the present disclosure, from the viewpoint of ejection stability during recording by an ink jet recording process, the surfactant is preferably a silicone-based surfactant. The silicone-based surfactant may be, for example, a polysiloxane compound, and is preferably a modified polysiloxane compound in which, to some of the methyl groups of dimethylpolysiloxane, organic groups are introduced. Examples of the modification include polyether modification, methylstyrene modification, alcohol modification, alkyl modification, aralkyl modification, fatty acid ester modification, epoxy modification, amine modification, amino modification, and mercapto modification. To some of the methyl groups of dimethylpolysiloxane, a plurality of organic group species may be introduced. In particular, from the viewpoint of ejection stability, the silicone-based surfactant is preferably a polyether-modified polysiloxane compound.

In the ink, the surfactant content relative to the total amount of the ink is preferably 0.001 mass % to 4.0 mass %, more preferably 0.01 mass % to 3.0 mass %, still more preferably 0.05 mass % to 2.0 mass %.

Additives

The ink may contain, as needed, additives such as a co-sensitizer, an ultraviolet absorbent, an antioxidant, an anti-fading agent, a conductive salt, a solvent, and a basic compound.

Properties

The ink has a pH of, from the viewpoint of, in the case of application using an ink jet recording process, improving the ejection stability, preferably 7 to 10, more preferably 7.5 to 9.5. The pH is measured using a pH meter at 25° C. and is measured using, for example, a pH meter (model "HM-31") manufactured by DKK-TOA CORPORATION.

The ink has a viscosity of preferably 0.5 mPa·s to 30 mPa·s, more preferably 2 mPa·s to 20 mPa·s, preferably 2 mPa·s to 15 mPa·s, more preferably 3 mPa·s to 10 mPa·s. The viscosity is measured using a viscometer at 25° C. and is measured using, for example, a TV-22 viscometer manufactured by Toki Sangyo Co., Ltd.

The ink has a surface tension of preferably 60 mN/m or less, more preferably 20 mN/m to 50 mN/m, still more preferably 25 mN/m to 45 mN/m. The surface tension is measured using a surface tensiometer at 25° C. and is measured using, for example, an Automatic Surface Tensiometer (product name "CBVP-Z") manufactured by Kyowa Interface Science Co., Ltd. by the plate method.

Image Recording Method

The image recording method according to the present disclosure includes an undercoat-composition application step of using the above-described ink set and applying, onto a substrate, an undercoat composition by an ink jet recording process, a first-actinic-energy-ray irradiation step of irradiating the undercoat composition with a first actinic energy ray, an ink application step of applying, onto the undercoat composition having been irradiated with the first actinic energy ray, an ink by an ink jet recording process, and a second-actinic-energy-ray irradiation step of irradiating the ink with a second actinic energy ray.

Undercoat-Composition Application Step

In the undercoat-composition application step, onto a substrate, the undercoat composition included in the ink set is applied by an ink jet recording process.

The type of the substrate is not particularly limited and the substrate may be ordinarily a publicly known substrate. In the case of being used in food package printing for flexible packaging, the substrate is preferably transparent. Note that "transparent" means having a visible radiation transmittance of 80% or more, preferably a visible radiation transmittance of 90% or more. The transparent substrate may be colored as long as it is transparent, but is preferably colorless.

The substrate may be, for example, formed of glass or quartz, or a plastic film or a plastic molded body. Examples of the resin forming the plastic film or the plastic molded body include cellulose diacetate, cellulose triacetate, cellulose propionate, cellulose butyrate, cellulose acetate butyrate, cellulose nitrate, acrylic resin, chlorinated polyolefin resin, polyethersulfone resin, polyethylene terephthalate (PET), polyethylene naphthalate, nylon, polyethylene, polystyrene, polypropylene, polycycloolefin resin, polyimide resin, polycarbonate resin, and polyvinyl acetal. The plastic film or the plastic molded body may be a film including only one of such resins, or a film formed of a mixture of two or more of the resins. Specific examples of the plastic molded body include food packages for flexible packaging, PET containers (such as PET bottles), and lid parts of containers (such as bottle caps (such as caps of PET bottles)).

The thickness of the substrate is not particularly limited and may be, for example, 1 µm to 10 mm. When the substrate is a film, its thickness is preferably 1 µm to 500 µm, more preferably 2 µm to 200 µm, still more preferably 5 µm to 100 µm, particularly preferably 10 µm to 90 µm. When the substrate is formed of glass, its thickness is preferably 0.1 mm to 10 mm, more preferably 0.15 mm to 8 mm, still more preferably 0.2 mm to 5 mm.

The ink jet recording process is not particularly limited as long as it is a process of recording of an image, and a publicly known process can be employed. Examples of the ink jet recording process include a charge control process of using an electrostatic attractive force to eject an ink, a drop-on-demand process (pressure pulse process) of using the vibration pressure of a piezoelectric element, an acoustic ink jet process of converting electric signals into an acoustic beam and irradiating an ink with the acoustic beam to use the radiation pressure to eject the ink, and a thermal ink jet (BUBBLE JET (registered trademark)) process of heating the ink to generate bubbles and using the resultant pressure.

For the ink jet head used for the ink jet recording process, there are a shuttle mode of using a short serial head and scanning the head in the width direction of the substrate to perform recording, and a line mode of using a line head in which recording elements are arranged so as to correspond to the whole area of one side of the substrate.

In the line mode, the substrate is scanned in a direction intersecting with the direction in which the recording elements are arranged, to thereby form a pattern over the entire surface of the substrate; thus, the transport mechanism for scanning the short head, such as a carriage, becomes unnecessary. In the line mode, the complicated scanning control for the movement of the carriage and the substrate becomes unnecessary, and the substrate alone is moved, so that a higher recording speed than in the shuttle mode can be achieved.

The drop volume of the undercoat composition ejected from the ink jet head is preferably 1 pL (picoliter) to 100 pL, more preferably 3 pL to 80 pL, still more preferably 3 pL to 50 pL.

First-Actinic-Energy-Ray Irradiation Step

In the first-actinic-energy-ray irradiation step, the undercoat composition is irradiated with a first actinic energy ray.

In the first-actinic-energy-ray irradiation step, from the viewpoint of further improving the image quality, irradiation with an actinic energy ray is preferably performed to semi-cure the undercoat composition. In the present disclosure, "semi-cured" means a state in which the polymerizable monomer included in the undercoat composition has a polymerization ratio of 80% or less. The polymerization ratio is preferably 10% or more. The polymerization ratio is calculated in the following manner.

Onto a substrate, the undercoat composition is applied and subsequently irradiated with an actinic energy ray; from the formed film, a sample piece having dimensions of 20 mm×50 mm (hereafter, referred to as the irradiated sample piece) is cut out. The cut-out irradiated sample piece is immersed in 10 mL of THF (tetrahydrofuran) for 24 hours, to obtain a leaching solution in which the undercoat composition is leached. The obtained leaching solution is subjected to high-performance liquid chromatography, to measure the amount of the polymerizable monomer (hereafter, referred to as "X1").

Separately, onto a substrate, the undercoat composition is applied and subsequently the same procedures as above are performed except that the irradiation with the actinic energy ray is not performed, to measure the amount of the polymerizable monomer (hereafter, referred to as "X2"). X1 and X2 are used to calculate a polymerization ratio by the following formula.

$$\text{Polymerization ratio (\%)} = \{(X2-X1)/X2\} \times 100$$

The actinic energy ray may be, for example, ultraviolet radiation, visible radiation, or an electron beam and is particularly preferably ultraviolet radiation (hereafter, also referred to as "UV").

The peak wavelength of the ultraviolet radiation is, for example, preferably 200 nm to 405 nm, more preferably 250 nm to 400 nm, still more preferably 300 nm to 400 nm.

The exposure dose in the irradiation with the actinic energy ray is, from the viewpoint of semi-curing the undercoat composition, preferably 3 $mJ/cm^2$ to 100 $mJ/cm^2$, more preferably 5 $mJ/cm^2$ to 20 $mJ/cm^2$.

As light sources for irradiation with ultraviolet radiation, mercury lamps, gas lasers, and solid-state lasers are mainly used and mercury lamps, metal halide lamps, and ultraviolet fluorescent lamps are widely known. UV-LEDs (light-emitting diodes) and UV-LDs (laser diodes) have small sizes, long longevity, and high efficiency, are provided at low costs, and are considered as promising light sources for irradiation with ultraviolet radiation. In particular, light sources for irradiation with ultraviolet radiation are preferably metal halide lamps, high-pressure mercury lamps, medium-pressure mercury lamps, low-pressure mercury lamps, or UV-LEDs.

Ink Application Step

In the ink application step, onto the undercoat composition having been irradiated with the first actinic energy ray, the ink included in the ink set is applied by an ink jet recording process.

The ink jet recording process is the same as that described in the undercoat-composition application step. In the ink application step, the same ink jet recording process as in the undercoat-composition application step is preferably used.

The drop volume of the ink ejected from the ink jet head is preferably 1 pL (picoliter) to 100 pL, more preferably 3 pL to 80 pL, still more preferably 3 pL to 50 pL.

In the ink application step, a single ink alone may be applied, or two or more inks may be applied. For example, in the case of recording a color image, at least color inks of yellow, cyan, magenta, and black are preferably applied; more preferably, color inks of white, yellow, cyan, magenta, and black are applied. The color inks may be applied in combination with a light color ink of, for example, light magenta or light cyan, an extra color ink of, for example, orange, green, or violet, a clear ink, or a metallic ink.

Second-Actinic-Energy-Ray Irradiation Step

In the second-actinic-energy-ray irradiation step, the ink is irradiated with a second actinic energy ray. In the second-actinic-energy-ray irradiation step, from the viewpoint of providing a recorded image having improved curability, irradiation with a second actinic energy ray is preferably performed in an atmosphere having an oxygen concentration of less than 1 vol %. The oxygen concentration is more preferably 0.5 vol % or less, still more preferably 0.3 vol % or less.

In the second-actinic-energy-ray irradiation step, the undercoat composition and the ink are preferably cured such that the radical-polymerizable compound in the undercoat composition and the radical-polymerizable compound in the ink have polymerization ratios of more than 80% and 100% or less. The polymerization ratios are each more preferably 85% to 100%, still more preferably 90% to 100%.

The actinic energy ray is, for example, ultraviolet radiation, visible radiation, or an electron beam, particularly preferably ultraviolet radiation. Examples of the light source for irradiation with ultraviolet radiation include those described above.

The peak wavelength of the ultraviolet radiation is, for example, preferably 200 nm to 405 nm, more preferably 250 nm to 400 nm, still more preferably 300 nm to 400 nm.

The exposure dose during irradiation with an actinic energy ray is, from the viewpoint of completely curing the undercoat composition and the ink, preferably 50 mJ/cm$^2$ to 1000 mJ/cm$^2$, more preferably 100 mJ/cm$^2$ to 500 mJ/cm$^2$.

Other Step

The image recording method according to the present disclosure may include, in addition to the undercoat-composition application step, the first-actinic-energy-ray irradiation step, the ink application step, and the second-actinic-energy-ray irradiation step, another step. As the other step, for example, a step of, after the ink application step, semi-curing the ink may be provided. In particular, in the case of applying two or more inks, after the first ink is applied, semi-curing of the first ink is preferably followed by application of the next ink. Note that, after application of the final ink, without semi-curing of the final ink, the second-actinic-energy-ray irradiation step is preferably performed.

The undercoat layer formed by applying the undercoat composition preferably has a thickness of 3 μm to 8 μm, and the ink layer formed by applying the ink preferably has a thickness of 5 μm to 15 μm. In the case of applying a plurality of inks, the above-described thickness of the ink layer means the total thickness of ink layers formed by applying the plurality of inks. When the thickness of the undercoat layer and the thickness of the ink layer are within such ranges, further improved alkali-peelability and further improved water resistance are provided. The ratio of the thickness of the ink layer to the thickness of the undercoat layer is preferably 1 to 10.

Recorded Article

The recorded article according to the present disclosure is provided by recording using the above-described ink set according to the present disclosure. The recorded article according to the present disclosure includes an undercoat layer being a solidified product of the undercoat composition of the ink set according to the present disclosure, and at least two ink images being cured products of the ink of the ink set according to the present disclosure and being different from each other in hue. In the two ink images, one of the ink images includes a dot code, and the other of the ink images includes at least one selected from the group consisting of a code image including a two-dimensional matrix code and a one-dimensional bar code and an image other than the code image. The two ink images are recorded so as to be different from each other in hue, to thereby have a composite image on the undercoat layer. Being different from each other in hue means colors that do not have maximum absorption wavelengths in the same wavelength region. For example, when yellow has the maximum absorption wavelength in 350 nm to 450 nm and cyan has the maximum absorption wavelength in 550 nm to 750 nm, these colors are different from each other in hue. The maximum absorption wavelengths are, as described later, values determined using a spectrophotometer including an integrating sphere attachment.

The dot code is a code in which a plurality of dots (dots) are arranged in a two-dimensional space.

The code image is an image including a code for reading information using a reader device, and includes a two-dimensional matrix code and a one-dimensional bar code. The two-dimensional matrix code is a code in which a pattern other than dots is disposed in a two-dimensional space and examples include a QR CODE (registered trademark), an SP code, and an AztecCode. The one-dimensional bar code is a code in which a plurality of lines having different thicknesses are arranged in a streaked pattern, and is what is called a bar code.

Examples of the image other than the code image include letters (including numbers) and patterns.

The undercoat layer is "a solidified product of the undercoat composition", which means that it is a dried product provided by drying the undercoat composition or a cured product provided by curing the undercoat composition by a polymerization curing reaction.

The ink image is "a cured product of the ink", which means that it is a cured product provided by curing components in the ink by a polymerization curing reaction.

In the recorded article according to the present disclosure, on the undercoat layer formed by solidifying the undercoat composition, two or more ink images different from each other in hue are recorded. The combination of two or more ink images may be a combination of a first image being a dot code or including a dot code and one or two second images selected from the group consisting of a code image including a two-dimensional matrix code and a one-dimensional bar code and an image other than the code image. The combination of ink images may be, for example, a composite image such as an image composed of a dot code and a two-dimensional matrix code, an image composed of a dot code and a one-dimensional bar code, or an image composed of a dot code, a two-dimensional matrix code, and an image other than code images (such as letters).

The at least two ink images different from each other in hue may be arranged side by side in the in-plane direction on the undercoat layer, or may be stacked so as to be overlapped in the normal direction relative to the undercoat layer. For example, one of the two ink images and the other may be disposed side by side in the in-plane direction, or one of the two ink images may be disposed on top of the other. In the latter case, on the first image being a dot code or including a dot code, one or two second images selected from the group consisting of a code image including a two-dimensional matrix code and a one-dimensional bar code and an image other than the code image may be disposed so as to form an overlapping region. The dot code has low visibility and hence the second image is preferably disposed on the first image. The second image is disposed on the first image, to thereby provide, without degradation of indication of the visible image, a composite image being a stack of the information image and the visible image.

The first image and the second image have a relation of being different from each other in hue. Thus, information due to the first image being a dot code or including a dot code and information due to the second image different from the first image are included. Preferably, the first image has at least one of a yellow-based hue or infrared absorbency and the second image has a visible color other than the yellow-based hue. More preferably, the dot code serving as the first image has at least one of a yellow-based hue or infrared absorbency, and one or two second images selected from the group consisting of a code image and an image other than the code image have a visible color other than the yellow-based hue.

The yellow-based hue refers to a hue having the maximum absorption wavelength in the wavelength region of 350 nm to 450 nm. The dot code having the yellow-based hue may be a cured product of an ink including a coloring agent having the maximum absorption wavelength in the wavelength region of 350 nm to 450 nm (preferably a yellow pigment). The maximum absorption wavelength is determined by using a spectrophotometer UV-3100PC (manufactured by SHIMADZU CORPORATION) including a 150 mmφ large integrating sphere attachment LISR-3100 (manufactured by SHIMADZU CORPORATION) to measure the reflection spectrum.

The visible color other than the yellow-based hue refers to any hue other than hues having the maximum absorption wavelength in the wavelength region of 350 nm to 450 nm. The visible color other than the yellow-based hue may be a chromatic color or an achromatic color. The visible colors include blue, green, orange, red, and white, for example.

The infrared absorbency refers to a property of having the maximum absorption wavelength in the wavelength region of 700 nm to 1500 nm.

From the viewpoint of invisibility of the ink image, in the ink image in the recorded article according to the present disclosure, the optical density (OD) at 450 nm is preferably $1/7$ or less of the optical density at the maximum absorption wavelength. The optical density is more preferably $1/8$ or less of the optical density at the maximum absorption wavelength, more preferably $1/9$ or less of the optical density at the maximum absorption wavelength. In the infrared absorption image, the optical density at the maximum absorption wavelength is, from the viewpoint of readability, preferably 0.1 or more, more preferably 0.3 or more, still more preferably 0.5 or more.

The maximum absorption wavelength is determined by, as in the case of the yellow-based hue, measuring the reflection spectrum.

The recorded article according to the present disclosure preferably includes a substrate and, on the substrate, the undercoat layer and the at least two ink images. The substrate has been described above in detail and will not be repeatedly described here.

An example of the recorded article according to the present disclosure will be described with reference to FIG. 1. FIG. 1 illustrates a state in which, on the top surface of the lid part (cap) of a PET bottle, an undercoat layer and two ink images are disposed.

As illustrated in FIG. 1, on a top surface 10 of a bottle cap 1 of the PET bottle, an undercoat layer (not shown) formed by applying an undercoat composition is formed; on the undercoat layer, a composite image is disposed in which a dot code 12 and a letter image 14 of "FUJIFILM" are formed so as to be stacked in this order. In FIG. 1, for example, a yellow-based ink is used to record the dot code 12 and, on the dot code 12, a cyan-based ink is used to record the letter image, so that, while the dot code information is unnoticeably provided, the display quality of the letter image can be maintained. When the bottle cap is recycled, the dot code 12 and the letter image 14 can be easily removed by subjecting the undercoat layer to alkali peeling.

EXAMPLES

Hereinafter, the present disclosure will be described more specifically with reference to Examples; however, the present disclosure within the spirit and scope thereof is not limited to the following Examples.

Example 1 to Example 37 and Comparative Example 1 to Comparative Example 5

Preparation of Undercoat Compositions

Polymerizable monomers A (monofunctional polymerizable monomers and bifunctional polymerizable monomers), a polymerization initiator, and surfactants described in Table 1-1 to Table 5 below were mixed together such that the components satisfied contents (mass %) described in Table 1-1 to Table 5. The mixtures were stirred using a mixer (product name "L4R", manufactured by Silverson) under conditions of 25° C. and 5000 revolutions/min for 20 minutes, to obtain undercoat compositions.

Preparation of Inks

First, a cyan pigment dispersion liquid was prepared.

A cyan pigment (300 parts by mass), 620 parts by mass of propoxylated (2) neopentyl glycol diacrylate (polymerizable compound; SR9003 (compound provided by diacrylation of a neopentyl glycol propylene oxide 2 mol adduct), manufactured by Sartomer), and 80 parts by mass of a dispersing agent (SOLSPERSE32000) were placed into a dispersing apparatus motormill M50 (manufactured by Eiger Torrance Ltd.), and zirconia beads having a diameter of 0.65 mm were used to perform dispersing treatment at a rotation speed of 9 m/s for 4 hours, to obtain a cyan pigment dispersion liquid.

Subsequently, such prepared cyan pigment dispersion liquids, polymerizable compounds B (monofunctional polymerizable compounds, bifunctional polymerizable compounds, and tri- or higher functional polymerizable compounds), a polymerization initiator, and a surfactant described in Table 5 below were mixed together such that the components satisfy contents (mass %) described in Table 5. The mixtures were stirred using a mixer (product name "L4R", manufactured by Silverson) under conditions of 25° C. and 5000 revolutions/min for 20 minutes, to obtain inks.

The details of the components described in Table 1-1 to Table 5 will be described below. Note that, for preparation of inks, Speedcure7010L (manufactured by Lambson Limited) was used. Speedcure7010L is a mixture of Speedcure7010 and EOTMPTA in a mixing ratio by mass of 1:1. Speedcure7010, which is a polymerization initiator, and EOTMPTA, which is a polymerizable compound, will be respectively described in the section of Polymerization initiator and the section of Polymerizable compound B.

Polymerizable Monomer a
Monofunctional Polymerizable Monomer
  LA: lauryl acrylate
  IBOA: isobornyl acrylate
  PEA: 2-phenoxyethyl acrylate
  CTFA: cyclic trimethylolpropane formal acrylate
  NVC: N-vinylcaprolactam
  THFA: tetrahydrofurfuryl acrylate
  EOEOEA: ethoxydiethylene glycol acrylate
  4HBA: 4-hydroxybutyl acrylate
  CEA: 2-carboxyethyl acrylate
  A-SA: 2-acryloyloxyethyl succinate (product name "A-SA", manufactured by Shin Nakamura Chemical Co., Ltd.)
Bifunctional Polymerizable Monomer.
  3MPDDA: 3-methyl-1,5-pentanediol diacrylate (product name "SR341", manufactured by Sartomer)
  PEG4DA: polyethylene glycol (200) diacrylate (product name "A-200", manufactured by Shin Nakamura Chemical Co., Ltd.)
  TCDDMDA: tricyclodecanedimethanol diacrylate (product name "SR833S", manufactured by Sartomer)
  NPGPODA: propoxylated (2) neopentyl glycol diacrylate (product name "SR9003", manufactured by Sartomer)
  HDDA: 1,6-hexanediol diacrylate
  TPGDA: tripropylene glycol diacrylate (product name "SR306", manufactured by Sartomer)
Polymerizable Compound B
Monofunctional Polymerizable Compound
  IBOA, NVC, PEA, and CTFA are the same as those described above.
Bifunctional Polymerizable Compound
  3MPDDA and NPGPODA are the same as those described above.
  PEG9DA: polyethylene glycol (400) diacrylate (product name "SR344", Sartomer)
Tri- or Higher Functional Polymerizable Compound
  EOTMPTA: trimethylolpropane EO-adduct triacrylate (trifunctional)
  PETA: pentaerythritol triacrylate (trifunctional)
Isocyanate Compound
  TAKENATED170N: isocyanurate of hexamethylene diisocyanate (manufactured by Mitsui Chemicals, Inc.)
Coloring Agent
  Cyan pigment: PB15: 4, product name "Heliogen (registered trademark) Blue D 7110 F" (manufactured by BASF)
Dispersing Agent
  SOLSPERSE32000: polyethylene imine-based dispersing agent (manufactured by Lubrizol Corporation)
Polymerization Initiator
  Omnirad819: bis(2,4,6-trimethylbenzoyl)phenylphosphine oxide (manufactured by IGM Resins B.V.)
  Speedcure7010: 1,3-di({α-[1-chloro-9-oxo-9H-thioxanthen-4-yl)oxy]acetylpoly [oxy (1-methylethylene)]}oxy)-2,2-bis({α-[1-methylethylene)]}oxymethyl)propane
Surfactant
  BYK-307: polyether-modified polydimethylsiloxane (manufactured by BYK Chemie GmbH)
  BYK-331: polyether-modified polydimethylsiloxane (manufactured by BYK Chemie GmbH)
  TEGO (registered trademark) Wet500: oxirane, methyl-, oxirane polymer, mono(3,5,5-trimethylhexyl) ether (manufactured by Evonik Industries)

Image Recording

An ink jet recording apparatus (product name "CylinderJET", manufactured by TRITEK Co., Ltd.) and an ink jet head (product name "KJ4A-RH", manufactured by KYOCERA Corporation) were used to apply, onto the body part of a glass bottle (product name "Sake M720PP", seller "Sekimori Seisakusyo co., ltd."), such a prepared undercoat composition. Specifically, onto a region having a size of 7 cm in the longitudinal direction of the glass bottle and a size of 10 cm in the circumferential direction of the glass bottle, the undercoat composition was applied under conditions of a drop volume of 11 pL (picoliters) and a resolution of 600×600 dpi (dot per inch), to record a 100% solid image having a thickness of 4 μm. Furthermore, under the same conditions as in the application of the undercoat composition, the prepared ink was applied onto the undercoat composition, to record a 100% solid image having a thickness of 4 μm. After the application of the undercoat composition and after the application of the ink, individually, an LED light source in the ink jet recording apparatus was used to perform irradiation with ultraviolet radiation at an exposure dose of 40 mJ/cm$^2$. As the LED light source, an UV-LED irradiation device having a peak wavelength of 385 nm (product name "G4B", manufactured by KYOCERA Corporation) was used. Subsequently, the glass bottle having the recorded image was placed into an exposure apparatus. The glass bottle was set horizontally. The exposure apparatus is configured to rotate the glass bottle. The whole image recorded on the glass bottle, while being rotated, was exposed using the LED light source. The exposure apparatus and a nitrogen-gas generation apparatus equipped with a compressor (product name "Maxi-Flow30", manufactured by Inhouse Gas Ltd.) were connected at a pressure of 0.2 MPa s; nitrogen was caused to flow such that, within the exposure apparatus, the oxygen concentration became 1 vol % or less. The LED light source was used to radiate ultraviolet radiation at an exposure dose of 500 mJ/cm$^2$ to completely cure the undercoat composition and the ink, to obtain an image recorded article.

Note that whether "completely cure" is achieved can be found by determining, for plain paper (for example, manufactured by Fuji Xerox Co., Ltd., copy paper C2, product code "V436") being pressed uniformly by a force (a fixed value in the range of 500 mN/cm$^2$ to 1,000 mN/cm$^2$) to the image, whether or not the image is transferred onto the plain paper. In other words, the case where the transfer does not occur at all is referred to as the completely cured state.

Evaluations

For each of Examples and Comparative Examples, the obtained image recorded article was evaluated in terms of alkali-peelability, water resistance, and odor. The evaluation methods are as follows.

Alkali-Peelability

The obtained image recorded article was immersed in a 1 mol/l aqueous sodium hydroxide solution at about 70° C. for 30 minutes. After 30 minutes elapsed, the image recorded article was taken out and the state of peeling was visually observed. When the image was not completely peeled from the image recorded article, the image was washed with tap water at a water pressure of 0.15 MPa and the time (washing time) elapsed until the image was completely peeled was measured. The washing time was 10 seconds at the maximum; when washing for 10 seconds did not achieve peeling, the state of peeling after washing for 10 seconds was observed. Evaluation grades will be described below. The shorter the washing time elapsed until the image is completely peeled, the higher the alkali-peelability.

Evaluation Grades
- 5: the image is completely peeled without washing with water
- 4: the washing time is within 5 seconds
- 3: the washing time is more than 5 seconds and 10 seconds or less
- 2: after washed for 10 seconds, the image is partially peeled
- 1: after washed for 10 seconds, the image is not peeled at all Water Resistance The obtained image recorded article was immersed in pure water at 40° C. for 24 hours. After 24 hours, the image recorded article was taken out; KIMTOWEL (registered trademark, manufactured by NIPPON PAPER CRECIA CO., LTD.) was used to remove drops of water and subsequently the state of peeling was visually observed. As a peeling ratio, the ratio of the area of peeling to the area of the image recorded was calculated. Evaluation grades will be described below. The smaller the area of peeling, the higher the water resistance.

Evaluation Grades
- 5: no peeling at all
- 4: the area of peeling is more than 0% and less than 1%
- 3: the area of peeling is 1% or more and less than 5%
- 2: the area of peeling is 5% or more and less than 30%
- 1: the area of peeling is 30% or more Odor The image recorded article was placed into a 333 mm×449 mm Ziploc plastic bag and left at 60° C. for 24 hours. After 24 hours, the plastic bag was opened and 10 assessors evaluated the odor. The assessors performed scoring on the basis of assessment grades: substantially no odor receives 4 points, a slight odor being scarcely unpleasant receives 3 points, a moderate odor being unpleasant receives 2 points, and a strong odor receives 1 point. On the basis of the average of points scored by the 10 assessors, the odor was evaluated. Evaluation grades are as follows.

Evaluation Grades
- 4: the average is 4 points.
- 3: the average is 3 points or more and less than 4 points
- 2: the average is 2 points or more and less than 3 points
- 1: the average is less than 2 points Table 1-1 to Table 5 describe components included in the undercoat compositions used in Examples and Comparative Examples. In Table 1-1 to Table 5, Ratio of polymerizable monomer having C log P value of 2.0 or less, Ratio of bifunctional polymerizable monomer having at least one of branched structure or alicyclic structure, and Ratio of monofunctional polymerizable monomer each mean a ratio relative to the total amount of the polymerizable monomer A. Table 5 describes components included in the inks used in Examples and Comparative Examples. In Table 5, Ratio of polymerizable monomer having C log P value of 2.0 or less and Ratio of bifunctional polymerizable monomer each mean a ratio relative to the total amount of the polymerizable compound B. In Table 5, Mass-ratio-based weighted mean of number of functional groups per unit molecular weight means the mass-ratio-based weighted mean of the number of the functional groups per unit molecular weight in the polymerizable compound B. The weighted mean was calculated in the following manner.

First, for each of polymerizable compounds B included in the ink, the following formula was used to calculate the number of functional groups per unit molecular weight.

Number of functional groups per unit molecular weight=(Number of functional groups of polymerizable compound $B$)/(Molecular weight of polymerizable compound $B$)×100

Subsequently, such obtained values were used to calculate the weighted mean on the basis of the contents of the polymerizable compounds B (mass %). The contents of the polymerizable compounds B are the contents relative to the total amount of the polymerizable compounds B. Specifically, the weighted mean was calculated by the following formula.

Weighted mean=Σ(Number of functional groups per unit molecular weight)×(Content)/100

Tables 7-1 to 7-3 describe evaluation results.

In Tables 7-1 to 7-3, in the column of Undercoat composition, the type of the undercoat composition, the content of the isocyanate compound included in the undercoat composition, and data concerning the polymerizable monomer A included in the undercoat composition are described. Specifically, those described are the content of the polymerizable monomer A1 included in the polymerizable monomer A and having a C log P value of 2.0 or less; whether or not the polymerizable monomer A1 has a molecular weight of 200 or more; whether or not the polymerizable monomer A1 has a C log P value of 1.0 or less and is a monofunctional polymerizable monomer; whether or not the polymerizable monomer A1 has an acid group; the ratio of a bifunctional polymerizable monomer having at least one of a branched structure or an alicyclic structure (specific structure); and the ratio of the monofunctional polymerizable monomer. For the content and the ratios, numerical values are described. The content of the isocyanate compound is based on the total amount of the undercoat composition, and the content and the ratios relating to the polymerizable monomer A are based on the total amount of the polymerizable monomer A, and are all provided in units of mass %. As to whether or not conditions described in Tables 7-1 to 7-3 are satisfied, cases satisfying the conditions are described with "Y" while cases not satisfying the conditions are described with "N".

The same applies to Tables 11-1 to 11-2 described later.

In Tables 7-1 to 7-3, in the column of Ink, the type of the ink and data concerning the polymerizable compound B included in the ink are described. Specifically, those described are the mass-ratio-based weighted mean of the number of the functional groups per unit molecular weight in the polymerizable compound B; the ratio of the tri- or higher functional polymerizable compound; whether or not the polymerizable compound B has a molecular weight of 200 or more; the ratio of the bifunctional polymerizable compound; and the content of the polymerizable compound having a C log P value of 1.5 or less. For the weighted mean, the content, and the ratios, numerical values are described. The ratio of the bifunctional polymerizable compound, the content of the polymerizable compound having a C log P value of 1.5 or less, and the ratio of the tri- or higher functional polymerizable compound are based on the total amount of the polymerizable compound B and are all provided in units of mass %. As to whether or not conditions described in Tables 7-1 to 7-3 are satisfied, cases satisfying the conditions are described with "Y" while cases not satisfying the conditions are described with "N".

The same applies to Tables 11-1 to 11-2 described later.

TABLE 1-1

| | | | | Molecular weight | ClogP value | Presence or absence of branched structure/ alicyclic structure | Presence or absence of acid group | Under-coat 1 | Under-coat 2 | Under-coat 3 | Under-coat 4 | Under-coat 5 | Under-coat 6 |
|---|---|---|---|---|---|---|---|---|---|---|---|---|---|
| Under-coat com-position | Poly-merizable monomer A | Mono-functional | LA | 240 | 6.62 | Absent | Absent | 25 | 25 | 25 | 15 | — | — |
| | | | IBOA | 208 | 4.66 | Absent | Absent | 35 | 30 | 30 | 30 | 30 | 25 |
| | | | PEA | 192 | 2.56 | Absent | Absent | 32 | 30 | 30 | 30 | 30 | 35 |
| | | | CTFA | 200 | 1.61 | Absent | Absent | 3 | 10 | — | 10 | 10 | 10 |
| | | | NVC | 139 | 1.53 | Absent | Absent | — | — | 10 | 10 | 15 | 15 |
| | | | THFA | 102 | 1.22 | Absent | Absent | — | — | — | — | 10 | — |
| | | | EOEOEA | 188 | 0.97 | Absent | Absent | — | — | — | — | — | — |
| | | | CEA | 114 | 0.42 | Absent | Present | — | — | — | — | — | — |
| | | | 4HBA | 144 | 0.40 | Absent | Absent | — | — | — | — | — | 10 |
| | | | A-SA | 216 | 0.16 | Absent | Present | — | — | — | — | — | — |
| Polymerization initiator | | | | Omnirad819 | | | | 4 | 4 | 4 | 4 | 4 | 4 |
| Isocyanate | | | | TAKENATE D170N | | | | — | — | — | — | — | — |
| Surfactant | | | | BYK-307 | | | | 1 | 1 | 1 | 1 | 1 | 1 |
| Ratio of polymerizable monomer having ClogP value of 2.0 or less (mass %) | | | | | | | | 3.2 | 10.5 | 10.5 | 21.1 | 36.8 | 36.8 |
| Ratio of bifunctional polymerizable monomer having branched structure/alicyclic structure (mass %) | | | | | | | | 0 | 0 | 0 | 0 | 0 | 0 |
| Ratio of monofunctional polymerizable monomer (mass %) | | | | | | | | 100 | 100 | 100 | 100 | 100 | 100 |

TABLE 1-2

| | | | | Molecular weight | ClogP value | Presence or absence of branched structure/alicyclic structure | Presence or absence of acid group | Under-coat 7 | Under-coat 8 | Under-coat 9 | Under-coat 10 | Under-coat 11 |
|---|---|---|---|---|---|---|---|---|---|---|---|---|
| Undercoat composition | Polymerizable monomer A | Mono-functional | LA | 240 | 6.62 | Absent | Absent | — | — | — | — | 25 |
| | | | IBOA | 208 | 4.66 | Absent | Absent | 30 | 25 | 25 | 25 | 35 |
| | | | PEA | 192 | 2.56 | Absent | Absent | 35 | 35 | 35 | 35 | 33 |
| | | | CTFA | 200 | 1.61 | Absent | Absent | 10 | 10 | 10 | 10 | 3 |
| | | | NVC | 139 | 1.53 | Absent | Absent | 15 | 15 | 15 | 15 | — |
| | | | THFA | 102 | 1.22 | Absent | Absent | — | — | — | — | — |
| | | | EOEOEA | 188 | 0.97 | Absent | Absent | — | — | 10 | — | — |
| | | | CEA | 114 | 0.42 | Absent | Present | — | — | — | 10 | — |
| | | | 4HBA | 144 | 0.40 | Absent | Absent | — | — | — | — | — |
| | | | A-SA | 216 | 0.16 | Absent | Present | 5 | 10 | — | — | — |
| Polymerization initiator | | | | Omnirad819 | | | | 4 | 4 | 4 | 4 | 4 |
| Isocyanate | | | | TAKENATE D170N | | | | — | — | — | — | — |
| Surfactant | | | | BYK-307 | | | | 1 | 1 | 1 | 1 | 0 |
| Ratio of polymerizable monomer having ClogP value of 2.0 or less (mass %) | | | | | | | | 31.6 | 36.8 | 36.8 | 36.8 | 3.1 |
| Ratio of bifunctional polymerizable monomer having branched structure/alicyclic structure (mass %) | | | | | | | | 0 | 0 | 0 | 0 | 0 |
| Ratio of monofunctional polymerizable monomer (mass %) | | | | | | | | 100 | 100 | 100 | 100 | 100 |

TABLE 2-1

| | | | | Molecular weight | ClogP value | Presence or absence of branched structure/alicyclic structure | Presence or absence of acid group | Under-coat 12 | Under-coat 13 | Under-coat 14 | Under-coat 15 | Under-coat 16 |
|---|---|---|---|---|---|---|---|---|---|---|---|---|
| Under-coat com-position | Poly-merizable monomer A | Mono-functional | IBOA | 208 | 4.66 | Absent | Absent | 25 | 20 | 20 | 25 | 20 |
| | | | PEA | 192 | 2.56 | Absent | Absent | 30 | 25 | 20 | 35 | 35 |
| | | | CTFA | 200 | 1.61 | Absent | Absent | 10 | 10 | 5 | 5 | 5 |
| | | | NVC | 139 | 1.53 | Absent | Absent | 15 | 15 | 15 | 15 | 15 |
| | | | A-SA | 216 | 0.16 | Absent | Present | 10 | 10 | 10 | 15 | 20 |
| | | Bifunctional | 3MPDDA | 226 | 2.90 | Present | Absent | 5 | 15 | 25 | — | — |
| | | | PEG4DA | 308 | 1.07 | Absent | Absent | — | — | — | — | — |
| Polymerization initiator | | | | Omnirad819 | | | | 4 | 4 | 4 | 4 | 4 |
| Isocyanate | | | | TAKENATE D170N | | | | — | — | — | — | — |
| Surfactant | | | | BYK-307 | | | | 1 | 1 | 1 | 1 | 1 |
| Ratio of polymerizable monomer having ClogP value of 2.0 or less (mass %) | | | | | | | | 36.8 | 36.8 | 31.6 | 36.8 | 42.1 |

TABLE 2-1-continued

| | Molecular weight | ClogP value | Presence or absence of branched structure/alicyclic structure | Presence or absence of acid group | Undercoat 12 | Undercoat 13 | Undercoat 14 | Undercoat 15 | Undercoat 16 |
|---|---|---|---|---|---|---|---|---|---|
| Ratio of bifunctional polymerizable monomer having branched structure/alicyclic structure (mass %) | | | | | 5.3 | 15.8 | 26.3 | 0 | 0 |
| Ratio of monofunctional polymerizable monomer (mass %) | | | | | 94.7 | 84.2 | 73.7 | 100 | 100 |

TABLE 2-2

| | | | | Molecular weight | ClogP value | Presence or absence of branched structure/alicyclic structure | Presence of acid or absence group | Undercoat 17 | Undercoat 18 | Undercoat 19 | Undercoat 20 |
|---|---|---|---|---|---|---|---|---|---|---|---|
| Undercoat composition | Polymerizable monomer A | Monofunctional | IBOA | 208 | 4.66 | Absent | Absent | 30 | 25 | 25 | 25 |
| | | | PEA | 192 | 2.56 | Absent | Absent | 35 | 30 | 20 | 30 |
| | | | CTFA | 200 | 1.61 | Absent | Absent | 10 | 10 | 10 | 10 |
| | | | NVC | 139 | 1.53 | Absent | Absent | 15 | 15 | 15 | 10 |
| | | | A-SA | 216 | 0.16 | Absent | Present | — | — | — | — |
| | | Bifunctional | 3MPDDA | 226 | 2.90 | Present | Absent | — | 5 | 15 | 5 |
| | | | PEG4DA | 308 | 1.07 | Absent | Absent | 5 | 10 | 10 | 15 |
| Polymerization initiator | | | Omnirad819 | | | | | 4 | 4 | 4 | 4 |
| Isocyanate | | | TAKENATE D170N | | | | | — | — | — | — |
| Surfactant | | | BYK-307 | | | | | 1 | 1 | 1 | 1 |
| Ratio of polymerizable monomer having ClogP value of 2.0 or less (mass %) | | | | | | | | 31.6 | 36.8 | 36.8 | 36.8 |
| Ratio of bifunctional polymerizable monomer having branched structure/alicyclic structure (mass %) | | | | | | | | 0 | 5.3 | 15.8 | 5.3 |
| Ratio of monofunctional polymerizable monomer (mass %) | | | | | | | | 94.7 | 84.2 | 73.7 | 78.9 |

TABLE 3

| | | | | Molecular weight | ClogP value | Presence or absence of branched structure/alicyclic structure | Presence or absence of acid group | Undercoat 21 | Undercoat 22 | Undercoat 23 | Undercoat 24 | Undercoat 25 | Undercoat 26 | Undercoat 27 |
|---|---|---|---|---|---|---|---|---|---|---|---|---|---|---|
| Undercoat composition | Polymerizable monomer A | Monofunctional | PEA | 192 | 2.56 | Absent | Absent | — | 15 | 30 | 30 | 30 | 30 | 30 |
| | | | A-SA | 216 | 0.16 | Absent | Present | 10 | 10 | 10 | 10 | 10 | 10 | 10 |
| | | Bifunctional | TCDDMDA | 304 | 4.66 | Present | Absent | — | — | — | — | — | — | — |
| | | | NPGPODA | 328 | 3.21 | Present | Absent | — | — | — | — | — | — | — |
| | | | HDDA | 226 | 3.02 | Absent | Absent | — | — | 55 | 53 | 50 | 50 | 50 |
| | | | 3MPDDA | 226 | 2.90 | Present | Absent | 85 | 70 | — | 2 | 5 | 5 | 5 |
| | | | TPGDA | 300 | 2.17 | Present | Absent | — | — | — | — | — | — | — |
| Polymerization initiator | | Omnirad819 | | | | | | 4 | 4 | 4 | 4 | 4 | 4 | 4 |
| Isocyanate | | TAKENATE D170N | | | | | | — | — | — | — | — | — | — |
| Surfactant | | BYK-307 | | | | | | 1 | 1 | 1 | 1 | 1 | — | — |
| Surfactant | | BYK-331 | | | | | | — | — | — | — | — | 1 | — |
| Surfactant | | TEGO Wet500 | | | | | | — | — | — | — | — | — | 1 |
| Ratio of polymerizable monomer having ClogP value of 2.0 or less (mass %) | | | | | | | | 10.5 | 10.5 | 10.5 | 10.5 | 10.5 | 10.5 | 10.5 |
| Ratio of bifunctional polymerizable monomer having branched structure/alicyclic structure (mass %) | | | | | | | | 89.5 | 73.7 | 0 | 2.1 | 5.3 | 5.3 | 5.3 |
| Ratio of monofunctional polymerizable monomer (mass %) | | | | | | | | 10.5 | 26.3 | 42.1 | 42.1 | 42.1 | 42.1 | 42.1 |

TABLE 4

| | | | | Molecular weight | ClogP value | Presence or absence of branched structure/alicyclic structure | Presence or absence of acid group | Undercoat 28 | Undercoat 29 | Undercoat 30 | Undercoat 31 | Undercoat 32 | Undercoat 33 |
|---|---|---|---|---|---|---|---|---|---|---|---|---|---|
| Undercoat composition | Polymerizable monomer | Monofunctional | PEA | 192 | 2.56 | Absent | Absent | 30 | 30 | 30 | 30 | 30 | 30 |
| | | | A-SA | 216 | 0.16 | Absent | Present | 10 | 10 | 10 | 10 | 10 | 10 |

TABLE 4-continued

| | | | | Molecular weight | ClogP value | Presence or absence of branched structure/ alicyclic structure | Presence or absence of acid group | Under- coat 28 | Under- coat 29 | Under- coat 30 | Under- coat 31 | Under- coat 32 | Under- coat 33 |
|---|---|---|---|---|---|---|---|---|---|---|---|---|---|
| sition | monomer A | Bi- functional | TCDDMDA | 304 | 4.66 | Present | Absent | — | — | — | — | 15 | — |
| | | | NPGPODA | 328 | 3.21 | Present | Absent | — | — | — | 15 | — | — |
| | | | HDDA | 226 | 3.02 | Absent | Absent | 40 | 20 | — | 40 | 40 | 40 |
| | | | 3MPDDA | 226 | 2.90 | Present | Absent | 15 | 35 | 55 | — | — | — |
| | | | TPGDA | 300 | 2.17 | Present | Absent | — | — | — | — | — | 15 |
| | Polymerization initiator | | Omnirad819 | | | | | 4 | 4 | 4 | 4 | 4 | 4 |
| | Isocyanate | | TAKENATE D170N | | | | | — | — | — | — | — | — |
| | Surfactant | | BYK-307 | | | | | 1 | 1 | 1 | 1 | 1 | 1 |
| Ratio of polymerizable monomer having ClogP value of 2.0 or less (mass %) | | | | | | | | 10.5 | 10.5 | 10.5 | 10.5 | 10.5 | 10.5 |
| Ratio of bifunctional polymerizable monomer having branched structure/alicyclic structure (mass %) | | | | | | | | 15.8 | 36.8 | 57.9 | 15.8 | 15.8 | 15.8 |
| Ratio of monofunctional polymerizable monomer (mass %) | | | | | | | | 42.1 | 42.1 | 42.1 | 42.1 | 42.1 | 42.1 |

TABLE 5

| | | | | Molecular weight | ClogP value | Presence or absence of branched structure/ alicyclic structure | Presence or absence of acid group | Undercoat 34 | Undercoat 35 |
|---|---|---|---|---|---|---|---|---|---|
| Undercoat composition | Polymerizable monomer A | Monofunctional | LA | 240 | 6.62 | Absent | Absent | 25 | — |
| | | | IBOA | 208 | 4.66 | Absent | Absent | 35 | — |
| | | | PEA | 192 | 2.56 | Absent | Absent | 35 | 28 |
| | | | A-SA | 216 | 0.16 | Absent | Present | — | 10 |
| | | Bifunctional | TCDDMDA | 304 | 4.66 | Present | Absent | — | — |
| | | | NPGPODA | 328 | 3.21 | Present | Absent | — | — |
| | | | HDDA | 226 | 3.02 | Absent | Absent | — | 35 |
| | | | 3MPDDA | 226 | 2.90 | Present | Absent | — | 10 |
| | | | TPGDA | 300 | 2.17 | Present | Absent | — | — |
| | | Tri- or higher functional | PETA | 298 | 2.38 | Absent | Absent | — | — |
| | Polymerization initiator | | Omnirad819 | | | | | 4 | 4 |
| | Isocyanate | | TAKENATE D170N | | | | | — | 12 |
| | Surfactant | | BYK-307 | | | | | 1 | 1 |
| Ratio of polymerizable monomer having ClogP value of 2.0 or less (mass %) | | | | | | | | 0 | 12.0 |
| Ratio of bifunctional polymerizable monomer having branched structure/alicyclic structure (mass %) | | | | | | | | 0 | 12.0 |
| Ratio of monofunctional polymerizable monomer (mass %) | | | | | | | | 100 | 45.8 |

TABLE 6

| | | | | Molecular weight | ClogP value | Ink 1 | Ink 2 | Ink 3 | Ink 4 | Ink 5 | Ink 6 | Ink 7 | Ink 8 |
|---|---|---|---|---|---|---|---|---|---|---|---|---|---|
| Ink | Polymerizable monomer B | Monofunctional | IBOA | 208 | 4.66 | — | — | 10 | — | — | — | 15 | — |
| | | | PEA | 192 | 2.56 | — | 10 | 10 | — | — | — | — | — |
| | | | CTFA | 200 | 1.61 | — | — | 15 | — | — | — | 20 | — |
| | | | NVC | 139 | 1.53 | — | — | 10 | — | — | — | 17 | — |
| | | Bifunctional | 3MPDDA | 226 | 2.90 | 77 | 67 | 32 | 81 | 66 | 51 | 20 | 67 |
| | | | NPGPODA | 328 | 3.21 | 6.2 | 6.2 | 6.2 | 6.2 | 6.2 | 6.2 | 6.2 | 6.2 |
| | | | PEG9DA | 522 | 0.19 | 4 | 4 | 4 | — | 15 | 30 | 9 | 4 |
| | | Tri- or higher functional | EOTMPTA | 428 | 3.97 | 2 | 2 | 2 | 2 | 2 | 2 | 2 | 2 |
| | | | PETA | 298 | 2.38 | — | — | — | — | — | — | — | 10 |
| | Polymerization initiator | | Omnirad819 | | | 4 | 4 | 4 | 4 | 4 | 4 | 4 | 4 |
| | | | Speedcure7010 | | | 2 | 2 | 2 | 2 | 2 | 2 | 2 | 2 |
| | Pigment | | Cyan pigment | | | 3 | 3 | 3 | 3 | 3 | 3 | 3 | 3 |
| | Dispersing agent | | SOLSPERSE32000 | | | 0.8 | 0.8 | 0.8 | 0.8 | 0.8 | 0.8 | 0.8 | 0.8 |
| | Surfactant | | BYK-307 | | | 1 | 1 | 1 | 1 | 1 | 1 | 1 | 1 |
| Mass-ratio-based weighted mean of number of functional groups per unit molecular weight | | | | | | 0.84 | 0.80 | 0.67 | 0.86 | 0.78 | 0.69 | 0.63 | 0.85 |
| Ratio of polymerizable compound having ClogP value of 1.5 or less (mass %) | | | | | | 4.5 | 4.5 | 4.5 | 0 | 16.8 | 33.6 | 10.1 | 4.5 |
| Ratio of bifunctional polymerizable compound (mass %) | | | | | | 97.8 | 86.5 | 47.3 | 97.8 | 97.8 | 97.8 | 39.5 | 86.5 |

TABLE 7-1

| | Undercoat composition | | | | | | | |
|---|---|---|---|---|---|---|---|---|
| | | | Polymerizable monomer A | | | | | |
| | | | | ClogP value of 2.0 or less | | | Ratio of bifunctional having specific structure | Ratio of monofunctional |
| | Type | Isocyanate | Content | Molecular weight of 200 or more | ClogP value of 1.0 or less and monofunctional | Acid group | | |
| Example 1 | Undercoat 1 | 0 | 3.2 | N | N | N | 0 | 100 |
| Example 2 | Undercoat 2 | 0 | 10.5 | N | N | N | 0 | 100 |
| Example 3 | Undercoat 3 | 0 | 10.5 | N | N | N | 0 | 100 |
| Example 4 | Undercoat 4 | 0 | 21.1 | N | N | N | 0 | 100 |
| Example 5 | Undercoat 5 | 0 | 36.8 | N | N | N | 0 | 100 |
| Example 6 | Undercoat 6 | 0 | 36.8 | N | N | N | 0 | 100 |
| Example 7 | Undercoat 7 | 0 | 31.6 | N | Y | Y | 0 | 100 |
| Example 8 | Undercoat 8 | 0 | 36.8 | N | Y | Y | 0 | 100 |
| Example 9 | Undercoat 9 | 0 | 36.8 | N | N | N | 0 | 100 |
| Example 10 | Undercoat 10 | 0 | 36.8 | N | N | Y | 0 | 100 |
| Example 11 | Undercoat 12 | 0 | 36.8 | N | Y | Y | 5.3 | 94.7 |
| Example 12 | Undercoat 13 | 0 | 36.8 | N | Y | Y | 15.8 | 84.2 |
| Example 13 | Undercoat 14 | 0 | 31.6 | N | Y | Y | 26.3 | 73.7 |
| Example 14 | Undercoat 15 | 0 | 36.8 | N | Y | Y | 0 | 100 |
| Example 15 | Undercoat 16 | 0 | 42.1 | N | Y | Y | 0 | 100 |
| Example 16 | Undercoat 17 | 0 | 31.6 | N | N | N | 0 | 94.7 |

| | Ink | | | | | | | |
|---|---|---|---|---|---|---|---|---|
| | | Polymerizable compound B | | | | Evaluations | | |
| | Type | Weighted mean | Ratio of tri- or higher functional | Molecular weight of 200 or more | Ratio of bifunctional | ClogP value of 1.5 or less | Alkali-peelability | Water resistance | Odor |
| Example 1 | Ink 1 | 0.84 | 2.2 | Y | 97.8 | 4.5 | 2 | 4 | 3 |
| Example 2 | Ink 1 | 0.84 | 2.2 | Y | 97.8 | 4.5 | 3 | 4 | 3 |
| Example 3 | Ink 1 | 0.84 | 2.2 | Y | 97.8 | 4.5 | 3 | 4 | 3 |
| Example 4 | Ink 1 | 0.84 | 2.2 | Y | 97.8 | 4.5 | 4 | 4 | 3 |
| Example 5 | Ink 1 | 0.84 | 2.2 | Y | 97.8 | 4.5 | 4 | 3 | 2 |
| Example 6 | Ink 1 | 0.84 | 2.2 | Y | 97.8 | 4.5 | 3 | 3 | 2 |
| Example 7 | Ink 1 | 0.84 | 2.2 | Y | 97.8 | 4.5 | 4 | 4 | 3 |
| Example 8 | Ink 1 | 0.84 | 2.2 | Y | 97.8 | 4.5 | 5 | 4 | 3 |
| Example 9 | Ink 1 | 0.84 | 2.2 | Y | 97.8 | 4.5 | 4 | 3 | 2 |
| Example 10 | Ink 1 | 0.84 | 2.2 | Y | 97.8 | 4.5 | 1 | 4 | 2 |
| Example 11 | Ink 1 | 0.84 | 2.2 | Y | 97.8 | 4.5 | 5 | 5 | 3 |
| Example 12 | Ink 1 | 0.84 | 2.2 | Y | 97.8 | 4.5 | 5 | 5 | 3 |
| Example 13 | Ink 1 | 0.84 | 2.2 | Y | 97.8 | 4.5 | 4 | 3 | 3 |
| Example 14 | Ink 1 | 0.84 | 2.2 | Y | 97.8 | 4.5 | 5 | 4 | 3 |
| Example 15 | Ink 1 | 0.84 | 2.2 | Y | 97.8 | 4.5 | 5 | 2 | 3 |
| Example 16 | Ink 1 | 0.84 | 2.2 | Y | 97.8 | 4.5 | 3 | 5 | 3 |

TABLE 7-2

| | Undercoat composition | | | | | | | |
|---|---|---|---|---|---|---|---|---|
| | | | Polymerizable monomer A | | | | | |
| | | | | ClogP value of 2.0 or less | | | Ratio of bifunctional having specific structure | Ratio of monofunctional |
| | Type | Isocyanate | Content | Molecular weight of 200 or more | ClogP value of 1.0 or less and monofunctional | Acid group | | |
| Example 17 | Undercoat 18 | 0 | 36.8 | N | N | N | 5.3 | 84.2 |
| Example 18 | Undercoat 19 | 0 | 36.8 | N | N | N | 15.8 | 73.7 |
| Example 19 | Undercoat 20 | 0 | 36.8 | N | N | N | 5.3 | 78.9 |
| Example 20 | Undercoat 20 | 0 | 36.8 | N | N | N | 5.3 | 78.9 |
| Example 21 | Undercoat 20 | 0 | 36.8 | N | N | N | 5.3 | 78.9 |
| Example 22 | Undercoat 20 | 0 | 36.8 | N | N | N | 5.3 | 78.9 |
| Example 23 | Undercoat 20 | 0 | 36.8 | N | N | N | 5.3 | 78.9 |
| Example 24 | Undercoat 20 | 0 | 36.8 | N | N | Z | 5.3 | 78.9 |
| Example 25 | Undercoat 21 | 0 | 10.5 | Y | Y | Y | 89.5 | 10.5 |

TABLE 7-2-continued

| | | | | | | | | | |
|---|---|---|---|---|---|---|---|---|---|
| Example 26 | Undercoat 22 | 0 | 10.5 | Y | Y | Y | 73.7 | 26.3 | |
| Example 27 | Undercoat 23 | 0 | 10.5 | Y | Y | Y | 0 | 42.1 | |
| Example 28 | Undercoat 24 | 0 | 10.5 | Y | Y | Y | 2.1 | 42.1 | |
| Example 29 | Undercoat 25 | 0 | 10.5 | Y | Y | Y | 5.3 | 42.1 | |
| Example 30 | Undercoat 26 | 0 | 10.5 | Y | Y | Y | 5.3 | 42.1 | |
| Example 31 | Undercoat 27 | 0 | 10.5 | Y | Y | Y | 5.3 | 42.1 | |
| Example 32 | Undercoat 28 | 0 | 10.5 | Y | Y | Y | 15.8 | 42.1 | |

| | Ink | | | | | | | |
|---|---|---|---|---|---|---|---|---|
| | | Polymerizable compound B | | | | Evaluations | | |
| | Type | Weighted mean | Ratio of tri- or higher functional | Molecular weight of 200 or more | Ratio of bifunctional | ClogP value of 1.5 or less | Alkali-peelability | Water resistance | Odor |
| Example 17 | Ink 1 | 0.84 | 2.2 | Y | 97.8 | 4.5 | 4 | 5 | 3 |
| Example 18 | Ink 1 | 0.84 | 2.2 | Y | 97.8 | 4.5 | 4 | 5 | 3 |
| Example 19 | Ink 1 | 0.84 | 2.2 | Y | 97.8 | 4.5 | 5 | 4 | 3 |
| Example 20 | Ink 2 | 0.80 | 2.2 | N | 86.5 | 4.5 | 5 | 4 | 2 |
| Example 21 | Ink 3 | 0.69 | 2.2 | N | 47.3 | 4.5 | 3 | 3 | 2 |
| Example 22 | Ink 4 | 0.86 | 2.2 | Y | 97.8 | 0 | 3 | 5 | 3 |
| Example 23 | Ink 5 | 0.78 | 2.2 | Y | 97.8 | 16.8 | 5 | 4 | 3 |
| Example 24 | Ink 6 | 0.69 | 2.2 | Y | 97.8 | 33.6 | 5 | 3 | 3 |
| Example 25 | Ink 1 | 0.84 | 2.2 | Y | 97.8 | 4.5 | 4 | 3 | 4 |
| Example 26 | Ink 1 | 0.84 | 2.2 | Y | 97.8 | 4.5 | 4 | 3 | 3 |
| Example 27 | Ink 1 | 0.84 | 2.2 | Y | 97.8 | 4.5 | 4 | 4 | 4 |
| Example 28 | Ink 1 | 0.84 | 2.2 | Y | 97.8 | 4.5 | 4 | 4 | 4 |
| Example 29 | Ink 1 | 0.84 | 2.2 | Y | 97.8 | 4.5 | 5 | 5 | 4 |
| Example 30 | Ink 1 | 0.84 | 2.2 | Y | 97.8 | 4.5 | 5 | 5 | 4 |
| Example 31 | Ink 1 | 0.84 | 2.2 | Y | 97.8 | 4.5 | 5 | 5 | 4 |
| Example 32 | Ink 1 | 0.84 | 2.2 | Y | 97.8 | 4.5 | 5 | 5 | 4 |

TABLE 7-3

| | Undercoat composition | | | | | | | |
|---|---|---|---|---|---|---|---|---|
| | | | Polymerizable monomer A | | | | | |
| | | | ClogP value of 2.0 or less | | | | Ratio of bifunctional having specific structure | Ratio of monofunctional |
| | Type | Isocyanate | Content | Molecular weight of 200 or more | ClogP value of 1.0 or less and monofunctional | Acid group | | |
| Example 33 | Undercoat 29 | 0 | 10.5 | Y | Y | Y | 36.8 | 42.1 |
| Example 34 | Undercoat 30 | 0 | 10.5 | Y | Y | Y | 57.9 | 42.1 |
| Example 35 | Undercoat 31 | 0 | 10.5 | Y | Y | Y | 15.8 | 42.1 |
| Example 36 | Undercoat 32 | 0 | 10.5 | Y | Y | Y | 15.8 | 42.1 |
| Example 37 | Undercoat 33 | 0 | 10.5 | Y | Y | Y | 15.8 | 42.1 |
| Comparative Example 1 | Undercoat 34 | 0 | 0 | N | N | N | 0 | 100 |
| Comparative Example 2 | Undercoat 35 | 12 | 12.0 | Y | Y | Y | 12.0 | 45.8 |
| Comparative Example 3 | Undercoat 12 | 0 | 36.8 | N | Y | Y | 5.3 | 94.7 |
| Comparative Example 4 | Undercoat 12 | 0 | 36.8 | N | Y | Y | 5.3 | 94.7 |
| Comparative Example 5 | Undercoat 11 | 0 | 3.2 | N | N | N | 0 | 100 |

TABLE 7-3-continued

| | | Ink | | | | | | | |
|---|---|---|---|---|---|---|---|---|---|
| | | Polymerizable compound B | | | | | Evaluations | | |
| | Type | Weighted mean | Ratio of tri- or higher functional | Molecular weight of 200 or more | Ratio of bifunctional | ClogP value of 1.5 or less | Alkali-peelability | Water resistance | Odor |
| Example 33 | Ink 1 | 0.84 | 2.2 | Y | 97.8 | 4.5 | 5 | 4 | 4 |
| Example 34 | Ink 1 | 0.84 | 2.2 | Y | 97.8 | 4.5 | 4 | 3 | 4 |
| Example 35 | Ink 1 | 0.84 | 2.2 | Y | 97.8 | 4.5 | 5 | 5 | 4 |
| Example 36 | Ink 1 | 0.84 | 2.2 | Y | 97.8 | 4.5 | 5 | 5 | 4 |
| Example 37 | Ink 1 | 0.84 | 2.2 | Y | 97.8 | 4.5 | 5 | 5 | 4 |
| Comparative Example 1 | Ink 1 | 0.84 | 2.2 | Y | 97.8 | 4.5 | 1 | 4 | 2 |
| Comparative Example 2 | Ink 1 | 0.84 | 2.2 | Y | 97.8 | 4.5 | 1 | 5 | 3 |
| Comparative Example 3 | Ink 7 | 0.63 | 2.2 | N | 39.5 | 10.1 | 2 | 2 | 1 |
| Comparative Example 4 | Ink 8 | 0.85 | 13.5 | Y | 86.5 | 4.5 | 2 | 3 | 2 |
| Comparative Example 5 | Ink 1 | 0.84 | 2.2 | Y | 97.8 | 4.5 | 1 | 4 | 3 |

As described in Tables 7-1 to 7-3, Example 1 to Example 37 have demonstrated that, compared with Comparative Example 1 to Comparative Example 5, the recorded images have high alkali-peelability and high water resistance.

On the other hand, Comparative Example 1, in which the undercoat composition does not include a polymerizable monomer having a C log P value of 2.0 or less, has demonstrated that the recorded image has low alkali-peelability.

Comparative Example 2, in which the undercoat composition includes 10 mass % or more of the isocyanate compound relative to the total amount of the undercoat composition, has demonstrated that the recorded image has low alkali-peelability.

Comparative Example 3, in which, in the polymerizable compound included in the ink, the mass-ratio-based weighted mean of the number of the functional groups per unit molecular weight is less than 0.65, has demonstrated that the recorded image has low alkali-peelability and low water resistance.

Comparative Example 4, in which the content of the tri- or higher functional polymerizable compound in the ink relative to the total amount of the polymerizable compound included in the ink is 10 mass % or more, has demonstrated that the recorded image has low alkali-peelability.

Comparative Example 5, in which the undercoat composition does not contain surfactant, has demonstrated that the recorded image has low alkali-peelability.

Example 2, which uses Undercoat 2 in which the content of the polymerizable monomer having a C log P value of 2.0 or less is 5 mass % or more, compared with Example 1, which uses Undercoat 1 in which the content of the polymerizable monomer having a C log P value of 2.0 or less is less than 5 mass %, has demonstrated that the recorded image has high alkali-peelability.

Example 14, which uses Undercoat 15 in which the content of the polymerizable monomer having a C log P value of 2.0 or less is 40 mass % or less, has demonstrated that, compared with Example 15, which uses Undercoat 16 in which the content of the polymerizable monomer having a C log P value of 2.0 or less is more than 40 mass %, the recorded image has high water resistance.

Example 27 is an example using Undercoat 23 in which all the polymerizable monomers having a C log P value of 2.0 or less have a molecular weight of 200 or more. Example 2 is an example using Undercoat 2 in which, of the polymerizable monomers having a C log P value of 2.0 or less, the polymerizable monomers partly have a molecular weight of less than 200. Example 27 has demonstrated that, compared with Example 2, the recorded image has high alkali-peelability and suppressed odor.

Example 10, which uses Undercoat 10 containing a polymerizable monomer having a C log P value of 2.0 or less and having an acid group, has demonstrated that, compared with Example 9, which uses Undercoat 9 not containing a polymerizable monomer having a C log P value of 2.0 or less and having an acid group, the recorded image has high water resistance.

Example 29, which uses Undercoat 25 in which, in the polymerizable monomers included in the undercoat composition, the ratio of the monofunctional polymerizable monomers is 30 mass % or more, has demonstrated that, compared with Reference Example 26, which uses Undercoat 22 in which, in the polymerizable monomers, the ratio of the monofunctional polymerizable monomers is less than 30 mass %, the recorded image has high alkali-peelability.

Example 29 and Example 32, which use Undercoat 25 and Undercoat 28 including 3 mass % to 20 mass % of the bifunctional polymerizable monomer having at least one of a branched structure or an alicyclic structure, have demonstrated that, compared with Example 28, which uses Undercoat 24 in which the amount of the bifunctional polymerizable monomer having at least one of a branched structure chain or an alicyclic structure is less than 3 mass %, the recorded image has high alkali-peelability and high water resistance.

Example 12, which uses Undercoat 13 including 3 mass % to 20 mass % of the bifunctional polymerizable monomer having at least one of a branched structure or an alicyclic structure, has demonstrated that, compared with Example 13, which uses Undercoat 14 in which the amount of the bifunctional polymerizable monomer having at least one of a branched structure or an alicyclic structure is more than 20 mass %, the recorded image has high alkali-peelability and high water resistance.

Example 19, which uses Ink 1 in which all the polymerizable compounds included in the ink have a molecular weight of 200 or more, has demonstrated that, compared with Example 20, which uses ink 2 in which, of the polymerizable compounds included in the ink, the polymerizable compounds partly have a molecular weight of less than 200, the recorded image has suppressed odor.

Example 19, which uses Ink 1 in which, in the polymerizable compounds included in the ink, the ratio of the bifunctional polymerizable compounds is 50 mass % or more, has demonstrated that, compared with Example 21, which uses ink 3 in which, in the polymerizable compounds included in the ink, the ratio of the bifunctional polymerizable compounds is less than 50 mass %, the recorded image has high alkali-peelability and high water resistance and has suppressed odor.

Example 19, which uses Ink 1 including 1 mass % to 30 mass % of the polymerizable compound having a C log P value of 1.5 or less, has demonstrated that, compared with Example 22, which uses Ink 4 in which the content of the polymerizable compound having a C log P value of 1.5 or less is 0 mass %, the recorded image has high alkali-peelability.

Example 19, which uses Ink 1 including 1 mass % to 30 mass % of the polymerizable compound having a C log P value of 1.5 or less, has demonstrated that, compared with Example 24, which uses Ink 6 in which the content of the polymerizable compound having a C log P value of 1.5 or less is more than 30 mass %, the recorded image has high water resistance.

Example 100

As an undercoat composition including a specific polymer, Undercoat 100 including components below was prepared. As a specific polymer A, a binder A, which is described in Paragraph 0225 of JP5588887B and described below, was used.
Undercoat 100
 IBOA 30 mass %
 NVC 15 mass %
 PEA 27 mass %
 LA 20 mass %
 Specific polymer A 3 mass %
 Omnirad819 4 mass %
 BYK-307 1 mass %

Undercoat 100 and Ink 1 were used and the same image recording method as in Example 1 above was performed to obtain an image recorded article. The obtained image recorded article was used and subjected to the same methods as the above-described evaluation methods, to perform evaluations in terms of alkali-peelability and water resistance. Example 100, which used Undercoat 100, provided, compared with Comparative Example 1 to Comparative Example 5, high alkali-peelability and high water resistance.

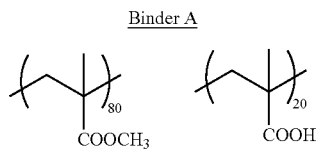

Example 101 to Example 113 and Comparative Example 6 to Comparative Example 11

Preparation of Undercoat Compositions

Polymerizable monomers A (monofunctional polymerizable monomers), an alkali-soluble polymer or alkali-insoluble polymer, a polymerization initiator, and a surfactant in Table 8-1 to Table 9-2 were mixed together such that the components satisfied the contents (mass %) described in Table 8-1 to Table 9-2. The mixtures were stirred using a mixer (product name "L4R", manufactured by Silverson) under conditions of 25° C. and 5000 revolutions/min for 20 minutes, to obtain undercoat compositions.

In Tables 9-1 and 9-2, the contents of the alkali-soluble polymers and the alkali-insoluble polymer (mass %) mean the solid contents of the polymers. For example, in the case of the styrene-maleic anhydride copolymer (SMA17352P, manufactured by KAWAHARA PETROCHEMICAL CO., LTD.), the solid content relative to the mass of the solid content of the undercoat composition is 5 mass %.

Preparation of Ink

First, the same method as in Example 1 and the like above was performed to prepare a cyan pigment dispersion liquid.

Subsequently, the prepared cyan pigment dispersion liquid, polymerizable compounds B (bifunctional polymerizable compounds and tri- or higher functional polymerizable compound), polymerization initiators, and a surfactant described in Table 10 below were mixed together such that the components satisfied the contents (mass %) in Table 10. The mixture was stirred using a mixer (product name "L4R", manufactured by Silverson) under conditions of 25° C. and 5000 revolutions/min for 20 minutes, to obtain Ink 9.

A part of the components in Tables 9-1 and 9-2 will be described below. Note that, for the components other than the following in Table 8-1 to Table 10, details thereof are the same as those described above.

Dianal BR113: polymethyl methacrylate (PMMA; manufactured by MITSUBISHI RAYON CO., LTD.)

Subsequently, the same methods as in the above-described "Image recording" and "Evaluations" were employed to perform image recording and evaluations. Tables 11-1 and 11-2 describe evaluation results.

TABLE 8-1

| | | | | ClogP value | Presence or absence of branched structure/ alicyclic structure | Presence or absence of acid group | Number of polymerizable groups | Undercoat 36 | Undercoat 37 | Undercoat 38 | Undercoat 39 | Undercoat 40 |
|---|---|---|---|---|---|---|---|---|---|---|---|---|
| Undercoat composition | Polymerizable monomer A | Monofunctional | IBOA (molecular weight: 208) | 4.66 | Absent | Absent | — | 30 | 30 | 30 | 30 | 30 |
| | | | NVC (molecular weight: 139) | 1.53 | Absent | Absent | — | 10 | 10 | 10 | 10 | 10 |
| | | | PLA (molecular weight: 192) | 2.56 | Absent | Absent | — | 30 | 30 | 30 | 30 | 30 |
| | | | LA (molecular weight: 240) | 6.62 | Absent | Absent | — | 20 | 20 | 20 | 20 | 20 |
| | Alkali-soluble polymer | | Styrene-maleic anhydride copolymer (SMA17352P, manufactured by KAWAHARA PETRO-CHEMICAL CO., LTD.) | — | — | Present | Absent | 5 | — | — | — | — |
| | | | Acrylic polymer NeoCryl BT20 (Kusumoto Chemicals, Ltd.) | — | — | Absent | Absent | — | 5 | — | — | — |
| | | | Polyurethane URLARNO KL424 (ARAKAWA CHEMICAL INDUSTRIES, LTD.) | — | — | Absent | Absent | — | — | 5 | — | — |
| | | | Binder A (weight-average molecular weight: 30000) | — | — | Present | Absent | — | — | — | 5 | — |
| | | | Acid-group-containing acrylic polymer (SB404, Sartomer Japan Inc.) | — | — | Present | 7 | — | — | — | — | 5 |
| | | | Acid-group-containing acrylic polymer (SB520M35, Sartomer Japan Inc.) | — | — | Present | 3 | — | — | — | — | — |
| Polymerization initiator | | | Omnirad 819 | | | | | 4 | 4 | 4 | 4 | 4 |
| Isocyanate | | | TAKENATE D170N | | | | | — | — | — | — | — |
| Surfactant | | | BYK-307 | | | | | 1 | 1 | 1 | 1 | 1 |
| | | | BYK-331 | | | | | — | — | — | — | — |
| | | | TEGO Wet500 | | | | | — | — | — | — | — |
| Ratio of polymerizable compound having ClogP value of 2.0 or less (mass %) | | | | | | | | 11.1 | 11.1 | 11.1 | 11.1 | 11.1 |
| Ratio of bifunctional polymerizable compound having branched structure/alicyclic structure (mass %) | | | | | | | | 0 | 0 | 0 | 0 | 0 |
| Ratio of monofunctional polymerizable compound (mass %) | | | | | | | | 100 | 100 | 100 | 100 | 100 |

TABLE 8-2

| | | | | ClogP value | Presence or absence of branched structure/ alicyclic structure | Presence or absence of acid group | Number of polymerizable groups | Undercoat 41 | Undercoat 42 | Undercoat 43 | Undercoat 44 |
|---|---|---|---|---|---|---|---|---|---|---|---|
| Undercoat composition | Polymerizable monomer A | Monofunctional | IBOA (molecular weight: 208) | 4.66 | Absent | Absent | — | 30 | 30 | 30 | 30 |
| | | | NVC (molecular weight: 139) | 1.53 | Absent | Absent | — | 10 | 10 | 10 | 10 |
| | | | PEA (molecular weight: 192) | 2.56 | Absent | Absent | — | 33.5 | 30 | 30 | 30 |
| | | | LA (molecular weight: 240) | 6.62 | Absent | Absent | — | 20 | 20 | 20 | 20 |
| | Alkali-soluble polymer | | Styrene-maleic anhydride copolymer (SMA17352P, manufactured by KAWAHARA PETROCHEMICAL CO., LTD.) | — | — | Present | Absent | — | — | — | — |
| | | | Acrylic polymer NeoCryl BT20 (Kusumoto Chemicals, Ltd.) | — | — | Absent | Absent | — | — | — | — |
| | | | Polyurethane UREARNO KL424 (ARAKAWA CHEMICAL INDUSTRIES, LTD.) | — | — | Absent | Absent | — | — | — | — |
| | | | Binder A (weight-average molecular weight: 30000) | — | — | Present | Absent | — | — | — | — |
| | | | Acid-group-containing acrylic polymer (SB404, Sartomer Japan Inc.) | — | — | Present | 7 | — | — | — | — |
| | | | Acid-group-containing acrylic polymer (SB520M35, Sartomer Japan Inc.) | — | — | Present | 3 | 1.5 | 5 | 5 | 5 |
| Polymerization initiator | | | Omnirad 819 | | | | | 4 | 4 | 4 | 4 |
| Isocyanate | | | TAKENATE D170N | | | | | — | — | — | — |

TABLE 8-2-continued

|  |  | ClogP value | Presence or absence of branched structure/ alicyclic structure | Presence or absence of acid group | Number of polymerizable groups | Under- coat 41 | Under- coat 42 | Under- coat 43 | Under- coat 44 |
|---|---|---|---|---|---|---|---|---|---|
| Surfactant | BYK-307 |  |  |  |  | 1 | 1 | — | — |
|  | BYK-331 |  |  |  |  | — | — | 1 | — |
|  | TEGO Wet500 |  |  |  |  | — | — | — | 1 |
| Ratio of polymerizable compound having ClogP value of 2.0 or less (mass %) |  |  |  |  |  | 10.7 | 11.1 | 11.1 | 11.1 |
| Ratio of bifunctional polymerizable compound having branched structure/alicyclic structure (mass %) |  |  |  |  |  | 0 | 0 | 0 | 0 |
| Ratio of monofunctional polymerizable compound (mass %) |  |  |  |  |  | 100 | 100 | 100 | 100 |

TABLE 9-1

|  |  |  |  | ClogP value | Presence or absence of branched structure/ alicyclic structure | Presence or absence of acid group | Number of polymerizable groups | Under- coat 45 | Under- coat 46 | Under- coat 47 | Under- coat 48 |
|---|---|---|---|---|---|---|---|---|---|---|---|
| Under- coat compo- sition | Poly- merizable monomer A | Mono func- tional | IBOA (molecular weight: 208) | 4.66 | Absent | Absent | — | 30 | 30 | 30 | 30 |
|  |  |  | NVC (molecular weight: 139) | 1.53 | Absent | Absent | — | 10 | 10 | 10 | 10 |
|  |  |  | PEA (molecular weight:192 ) | 2.56 | Absent | Absent | — | 25 | 20 | 30 | 30 |
|  |  |  | LA (molecular weight: 240) | 6.62 | Absent | Absent | — | 20 | 20 | 20 | 20 |
|  |  | Acid-group-containing acrylic polymer (SB520M35, Sartomer Japan Inc.) |  | — | — | Present | 3 | 10 | 15 | — | — |
|  |  | Acid-group-containing acrylic polymer CYCLOMER P Z200M (DAICEL- ALLNEX LTD .; weight-average molecular weight: 12000) |  | — | — | Present | Absent | — | — | 5 | — |
|  |  | Acid-group-containing acrylic polymer CYCLOMER P Z254F (DAICEL- ALLNEX LTD.; weight-average molecular weight: 21000) |  | — | — | Present | Absent | — | — | — | 5 |
|  | Alkali-insoluble polymer | Dianal BR113: (manufactured by MITSUBISHI RAYON CO.,LTD .; PMMA) |  | — | — | Absent | Absent | — | — | — | — |
|  | Polymerization initiator | Omnirad 819 |  |  |  |  |  | 4 | 4 | 4 | 4 |
|  | Isocyanate | TAKENATE D170N |  |  |  |  |  | — | — | — | — |
|  | Surfactant | BYK-307 |  |  |  |  |  | 1 | 1 | 1 | 1 |
| Ratio of polymerizable compound having ClogP value of 2.0 or less (mass %) |  |  |  |  |  |  |  | 11.8 | 12.5 | 11.1 | 11.1 |
| Ratio of bifunctional polymerizable compound having branched structure/alicyclic structure (mass %) |  |  |  |  |  |  |  | 0 | 0 | 0 | 0 |
| Ratio of monofunctional polymcrizable compound (mass %) |  |  |  |  |  |  |  | 100 | 100 | 100 | 100 |

TABLE 9-2

|  |  |  |  | ClogP value | Presence or absence of branched structure/ alicyclic structure | Presence or absence of acid group | Number of polymerizable groups | Under- coat 49 | Under- coat 50 | Under- coat 51 | Under- coat 52 |
|---|---|---|---|---|---|---|---|---|---|---|---|
| Under- coat compo- sition | Poly- merizable monomer A | Mono func- tional | IBOA (molecular weight: 208) | 4.66 | Absent | Absent | — | 30 | 30 | 30 | 30 |
|  |  |  | NVC (molecular weight: 139) | 1.53 | Absent | Absent | — | 10 | 10 | 10 | 10 |
|  |  |  | PEA (molecular weight:192 ) | 2.56 | Absent | Absent | — | 30 | 34.5 | 10 | 34.5 |
|  |  |  | LA (molecular weight: 240) | 6.62 | Absent | Absent | — | 20 | 20 | 20 | 20 |
|  |  | Acid-group-containing acrylic polymer (SB520M35, Sartomer Japan Inc.) |  | — | — | Present | 3 | — | 0.5 | 25 | 1.5 |
|  |  | Acid-group-containing acrylic polymer CYCLOMER P Z200M (DAICEL- ALLNEX LTD.; weight-average molecular weight: 12000) |  | — | — | Present | Absent | — | — | — | — |
|  |  | Acid-group-containing acrylic polymer CYCLOMER P Z254F (DAICEL- ALLNEX LTD.; weight-average molecular weight: 21000) |  | — | — | Present | Absent | — | — | — | — |

TABLE 9-2-continued

|  |  | ClogP value | Presence or absence of branched structure/ alicyclic structure | Presence or absence of acid group | Number of poly- merizable groups | Under- coat 49 | Under- coat 50 | Under- coat 51 | Under- coat 52 |
|---|---|---|---|---|---|---|---|---|---|
| Alkali-insoluble polymer | Dianal BR113: (manufactured by MITSUBISHI RAYON CO., LTD.; PMMA) | — | — | Absent | Absent | 5 | — | — | — |
| Polymerization initiator | Omnirad 819 |  |  |  |  | 4 | 4 | 4 | 4 |
| Isocyanate | TAKENATE D170N |  |  |  |  | — | — | — | — |
| Surfactant | BYK-307 |  |  |  |  | 1 | 1 | 1 | — |
| Ratio of polymerizable compound having ClogP value of 2.0 or less (mass %) |  |  |  |  |  | 11.1 | 10.6 | 14.3 | 10.6 |
| Ratio of bifunctional polymerizable compound having branched structure/alicyclic structure (mass %) |  |  |  |  |  | 0 | 0 | 0 | 0 |
| Ratio of monofunctional polymerizable compound (mass %) |  |  |  |  |  | 100 | 100 | 100 | 100 |

TABLE 10

|  |  |  |  | Molecular weight | ClogP value | Ink 9 |
|---|---|---|---|---|---|---|
| Ink | Polymerizable compound B | Bifunctional | SR341 (3MPDDA) | 226 | 2.90 | 77 |
|  |  |  | SR9003 (NPGPODA) derived from mill base | 328 | 3.21 | 6.2 |
|  |  |  | SR344 (PEG9DA) | 522 | 0.19 | 4 |
|  |  | Tri- or higher functional | EOTMPTA | 428 | 3.97 | 2 |
|  | Polymerization initiator |  | Omnirad819 |  |  | 4 |
|  |  |  | Speedcure7010 |  |  | 2 |
|  | Pigment |  | Cyan pigment |  |  | 3 |
|  | Dispersing agent |  | SOLSPERSE32000 |  |  | 0.8 |
|  | Surfactant |  | BYK-307 |  |  | 1 |
|  | Mass-ratio-based weighted mean of number of functional groups per unit molecular weight |  |  |  |  | 0.84 |
|  | Ratio of polymerizable compound having ClogP value of 1.5 or less (mass %) |  |  |  |  | 4.5 |
|  | Ratio of bifunctional polymerizable compound (mass %) |  |  |  |  | 97.8 |

TABLE 11-1

| | | Undercoat composition | | | | | |
|---|---|---|---|---|---|---|---|
| | | Polymerizable monomer A | | | | | |
| | | | ClogP value of 2.0 or less | | | Ratio of | |
| | Type | Iso- cyanate | Content | Molecular weight of 200 or more | ClogP value of 1.0 or less and mono- functional | Acid group | bifunctional having specific structure | Ratio of mono- functional |
| Example 101 | Undercoat 36 | 0 | 11.1 | Y | N | N | 0 | 100 |
| Example 102 | Undercoat 37 | 0 | 11.1 | Y | N | N | 0 | 100 |
| Example 103 | Undercoat 38 | 0 | 11.1 | Y | N | N | 0 | 100 |
| Example 104 | Undercoat 39 | 0 | 11.1 | Y | N | N | 0 | 100 |
| Example 105 | Undercoat 40 | 0 | 11.1 | Y | N | N | 0 | 100 |
| Example 106 | Undercoat 41 | 0 | 10.7 | Y | N | N | 0 | 100 |
| Example 107 | Undercoat 42 | 0 | 11.1 | Y | N | N | 0 | 100 |
| Example 108 | Undercoat 43 | 0 | 11.1 | Y | N | N | 0 | 100 |
| Example 109 | Undercoat 44 | 0 | 11.1 | Y | N | N | 0 | 100 |
| Example 110 | Undercoat 45 | 0 | 11.8 | Y | N | N | 0 | 100 |

TABLE 11-1-continued

| | | Ink | | | | | | | |
|---|---|---|---|---|---|---|---|---|---|
| | | Polymerizable compound B | | | | | Evaluations | | |
| | Type | Weighted mean | Ratio of tri- or higher functional | Molecular weight of 200 or more | Ratio of bifunctional | ClogP value of 1.5 or less | Alkali-peelability | Water resistance | Odor |
| Example 101 | Ink 9 | 0.84 | 2.2 | Y | 97.8 | 4.0 | 5 | 4 | 3 |
| Example 102 | Ink 9 | 0.84 | 2.2 | Y | 97.8 | 4.0 | 5 | 4 | 3 |
| Example 103 | Ink 9 | 0.84 | 2.2 | Y | 97.8 | 4.0 | 5 | 4 | 3 |
| Example 104 | Ink 9 | 0.84 | 2.2 | Y | 97.8 | 4.0 | 5 | 4 | 3 |
| Example 105 | Ink 9 | 0.84 | 2.2 | Y | 97.8 | 4.0 | 5 | 4 | 3 |
| Example 106 | Ink 9 | 0.84 | 2.2 | Y | 97.8 | 4.0 | 4 | 5 | 3 |
| Example 107 | Ink 9 | 0.84 | 2.2 | Y | 97.8 | 4.0 | 5 | 5 | 3 |
| Example 108 | Ink 9 | 0.84 | 2.2 | Y | 97.8 | 4.0 | 5 | 5 | 3 |
| Example 109 | Ink 9 | 0.84 | 2.2 | Y | 97.8 | 4.0 | 5 | 5 | 3 |
| Example 110 | Ink 9 | 0.84 | 2.2 | Y | 97.8 | 4.0 | 5 | 5 | 3 |

TABLE 11-2

| | | Undercoat composition | | | | | | |
|---|---|---|---|---|---|---|---|---|
| | | | Polymerizable monomer A | | | | | |
| | | | | ClogP value of 2.0 or less | | | | Ratio of |
| | Type | Iso-cyanate | Content | Molecular weight of 200 or more | ClogP value of 1.0 or less and mono-functional | Acid group | Ratio of bifunctional having specific structure | Ratio of mono-functional |
| Example 111 | Undercoat 46 | 0 | 12.5 | Y | N | N | 0 | 100 |
| Example 112 | Undercoat 47 | 0 | 11.1 | Y | N | N | 0 | 100 |
| Example 113 | Undercoat 48 | 0 | 11.1 | Y | N | N | 0 | 100 |
| Comparative Example 6 | Undercoat 49 | 0 | 11.1 | Y | N | N | 0 | 100 |
| Comparative Example 7 | Undercoat 50 | 0 | 10.6 | Y | N | N | 0 | 100 |
| Comparative Example 8 | Undercoat 51 | 0 | 14.3 | Y | N | N | 0 | 100 |
| Comparative Example 9 | Undercoat 52 | 0 | 10.7 | Y | N | N | 0 | 100 |
| Comparative Example 10 | Undercoat 42 | 0 | 11.1 | Y | N | N | 0 | 100 |
| Comparative Example 11 | Undercoat 42 | 0 | 11.1 | Y | N | N | 0 | 100 |

| | | Ink | | | | | | | |
|---|---|---|---|---|---|---|---|---|---|
| | | Polymerizable compound B | | | | | Evaluations | | |
| | Type | Weighted mean | Ratio of tri- or higher functional | Molecular weight of 200 or more | Ratio of bifunctional | ClogP value of 1.5 or less | Alkali-peelability | Water resistance | Odor |
| Example 111 | Ink 9 | 0.84 | 2.2 | Y | 97.8 | 4.0 | 4 | 4 | 3 |
| Example 112 | Ink 9 | 0.84 | 2.2 | Y | 97.8 | 4.0 | 5 | 4 | 3 |

TABLE 11-2-continued

| | | | | | | | | |
|---|---|---|---|---|---|---|---|---|
| Example 113 | Ink 9 | 0.84 | 2.2 | Y | 97.8 | 4.0 | 4 | 5 | 3 |
| Comparative Example 6 | Ink 9 | 0.84 | 2.2 | Y | 97.8 | 4.0 | 1 | 4 | 2 |
| Comparative Example 7 | Ink 9 | 0.84 | 2.2 | Y | 97.8 | 4.0 | 1 | 4 | 3 |
| Comparative Example 8 | Ink 9 | 0.84 | 2.2 | Y | 97.8 | 4.0 | 3 | 1 | 3 |
| Comparative Example 9 | Ink 9 | 0.84 | 2.2 | Y | 97.8 | 4.0 | 1 | 5 | 3 |
| Comparative Example 10 | Ink 7 | 0.63 | 2.2 | N | 39.5 | 10.1 | 2 | 2 | 1 |
| Comparative Example 11 | Ink 8 | 0.85 | 13.5 | Y | 86.5 | 4.5 | 2 | 3 | 2 |

As described in Tables 11-1 and 11-2, in Example 101 to Example 113, compared with Comparative Example 6 to Comparative Example 9, which used the alkali-insoluble polymer, the recorded images have high alkali-peelability and high water resistance.

Comparative Example 10, in which, in the polymerizable compounds included in the ink, the mass-ratio-based weighted mean of the number of the functional groups per unit molecular weight is less than 0.65, has demonstrated that the recorded image has low alkali-peelability and low water resistance.

Comparative Example 11, in which the ink has a tri- or higher functional polymerizable compound content of, relative to the total amount of polymerizable compounds included in the ink, 10 mass % or more, has demonstrated that the recorded image has low alkali-peelability.

Example 201

Figure 2:
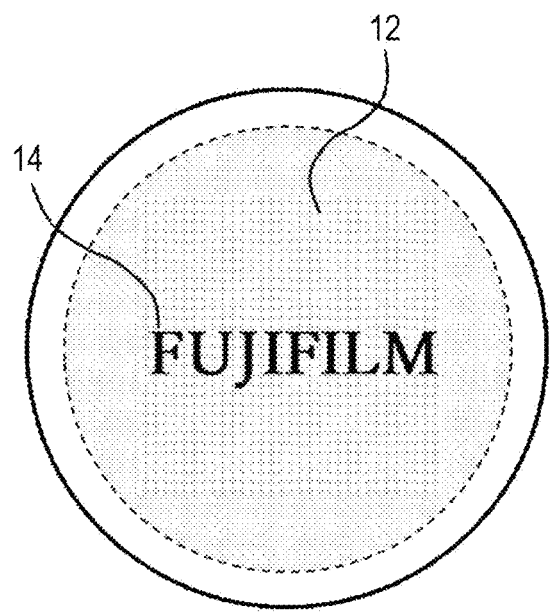
FIG. 2 is a schematic plan view of the bottle cap in FIG. 1.

Onto the surface of the cap (bottle cap) of a PET bottle, an ink jet printer (manufactured by Dimatix, Inc., DMP-2381) was used to apply Undercoat 12 in Table 2-1 under ejection conditions of 600 dpi and a drop volume of 10 pl, to record a 25 mmφ 100% solid image (thickness: 4 μm). After the recording, an LED exposure apparatus serving as an exposure unit disposed on a downstream side relative to the ink jet printer was used to expose, under conditions of an irradiation wavelength of 395 nm and an exposure dose of 40 mJ/cm$^2$, the solid image, to provide a semi-cured solid image. Subsequently, onto the semi-cured solid image, a yellow ink was applied under the same conditions as above, to thereby record, as illustrated in FIG. 1 to FIG. 2, a screen code from Apollo Japan Co., Ltd. The yellow ink is an ink prepared such that, in Ink 1 in Table 5, the cyan pigment was replaced by Novoperm Yellow H2G (CLARIANT). Subsequently, onto the recorded screen code, Ink 1 in Table 5 was further applied under the same conditions as above to record, as illustrated in FIG. 1 to FIG. 2, a logo "FUJIFILM" (letter image, thickness: 4 μm) over the screen code. After the recording, in a nitrogen atmosphere having an oxygen concentration of 1% or less, the LED exposure unit was used to perform exposure under conditions of a wavelength of 385 nm and an illuminance of 3000 mW/cm$^2$ for 1 second, to cure the undercoat layer, the screen code, and the logo (letter image).

Evaluations

The screen code was linked to the WEB site of the homepage of FUJIFILM Corporation. A smartphone in which a reader application from Apollo Japan Co., Ltd. was installed was used to read the dot code.

(a) screen code readability

The screen code was read to display, on the display unit of the smartphone, the homepage of FUJIFILM Corporation.

(b) letter visibility

The letters were sufficiently visible.

(c) alkali-peelability

Into a 1.5 mass % aqueous sodium hydroxide solution at a temperature of 80° C., the bottle cap having the recorded dot code and logo was immersed for 15 minutes. As a result, removal of the image was achieved.

(d) water resistance

The bottle cap having the recorded dot code and logo was immersed in water at 25° C. for 1 day. As a result, peeling of the dot code and logo was not observed.

Example 202

Recording and exposure were performed on the surface of a bottle cap as in Example 201 except that, in Example 201, the ink jet printer was replaced by a pad printer (PAD BOY TH-1A), forms individually corresponding to the undercoat layer, the screen code, and the logo (letter image) were produced, and a silicone pad (model: 045-F2) was used to perform recording, to prepare a sample. The prepared sample was subjected to the same evaluations (a to d) as in Example 201 and was confirmed to have the same performances as in Example 201.

Note that the entire contents disclosed by JP2020-084438 filed in the Japan Patent Office on May 13, 2020 and JP2020-155882 filed in the Japan Patent Office on Sep. 16, 2020 are incorporated herein by reference. All the documents, patent applications, and technical standards mentioned in this Specification are incorporated herein by reference to the same extent as in the case where the documents, patent applications, and technical standards are each specifically and individually described as being incorporated herein by reference.

What is claimed is:

1. An ink set comprising:
   an undercoat composition comprising at least one of a polymerizable monomer A including a polymerizable monomer A1 having a C log P value of 2.0 or less or an alkali-soluble polymer, and a surfactant; and
   an ink comprising a polymerizable compound B,
   wherein, in the polymerizable monomer A, a ratio of a monofunctional polymerizable monomer is 30 mass % or more, the polymerizable monomer A further includes a bifunctional polymerizable monomer A2 having at least one of a branched structure or an alicyclic structure, and a content of the bifunctional polymerizable monomer A2 relative to a total amount of the polymerizable monomer A is 3 mass % to 20 mass %, the undercoat composition comprises an isocyanate compound at a content of, relative to a total amount of the undercoat composition, less than 10 mass %, the undercoat composition comprises the alkali-soluble polymer at a content of, relative to a mass of a solid content of the undercoat composition, 1 mass % or more and 20 mass % or less, a mass-ratio-based weighted mean of a number of functional groups in the polymerizable compound B, per unit molecular weight, is 0.65 or more, provided that a unit molecular weight of the polymerizable compound B being defined as 100, and the ink comprises a tri- or higher functional polymerizable compound at a content of, relative to a total amount of the polymerizable compound B, less than 10 mass %.

2. The ink set according to claim 1, wherein the polymerizable monomer A1 is at least one of a monofunctional polymerizable monomer or a bifunctional polymerizable monomer.

3. The ink set according to claim 1, wherein a content of the polymerizable monomer A1 relative to a total amount of the polymerizable monomer A is 5 mass % to 40 mass %.

4. The ink set according to claim 1, wherein the polymerizable monomer A1 has a molecular weight of 200 or more.

5. The ink set according to claim 1, wherein the polymerizable monomer A1 has a C log P value of 1.0 or less and is a monofunctional polymerizable monomer.

6. The ink set according to claim 1, wherein the polymerizable monomer A1 includes a polymerizable monomer A11 having an acid group.

7. The ink set according to claim 1, wherein the polymerizable compound B has a molecular weight of 200 or more.

8. The ink set according to claim 1, wherein, in the polymerizable compound B, a ratio of a bifunctional polymerizable compound is 50 mass % or more.

9. The ink set according to claim 1, wherein the polymerizable compound B includes a polymerizable compound B1 having a C log P value of 1.5 or less, and a content of the polymerizable compound B1 relative to a total amount of the polymerizable compound B is 1 mass % to 30 mass %.

10. The ink set according to claim 1, wherein the alkali-soluble polymer has an acid group in its molecule.

11. The ink set according to claim 10, wherein the alkali-soluble polymer is a radical-polymerizable compound having a radical-polymerizable group.

12. The ink set according to claim 11, wherein the radical-polymerizable compound has, in a single molecule, 2 to 4 radical-polymerizable groups.

13. An image recording method using the ink set according to claim 1, the method comprising:

applying, onto a substrate, the undercoat composition by an ink jet recording process;

irradiating the undercoat composition with a first actinic energy ray;

applying, onto the undercoat composition having been irradiated with the first actinic energy ray, the ink by an ink jet recording process; and irradiating the ink with a second actinic energy ray.

14. The image recording method according to claim 13, wherein, in the irradiating the undercoat composition with a first actinic energy ray, the undercoat composition is semi-cured, and the irradiation with the second actinic energy ray is performed in an atmosphere having an oxygen concentration of less than 1 vol %.

15. A recorded article comprising:

an undercoat layer being a solidified product of the undercoat composition of the ink set according to claim 1, and at least two ink images being cured products of the ink of the ink set according to claim 1 and being different from each other in hue, wherein the at least two ink images comprise: an image including a dot code; and another image including at least one selected from the group consisting of a code image including a two-dimensional matrix code and a one-dimensional bar code and an image other than the code image.

16. The recorded article according to claim 15, wherein the dot code has at least one of a yellow-based hue or infrared absorbency and the at least one selected from the group has a visible color other than the yellow-based hue.

* * * * *